(12) United States Patent
Ito et al.

(10) Patent No.: US 9,418,293 B2
(45) Date of Patent: Aug. 16, 2016

(54) INFORMATION PROCESSING APPARATUS, CONTENT PROVIDING METHOD, AND COMPUTER PROGRAM

(71) Applicant: SONY CORPORATION, Tokyo (JP)

(72) Inventors: Akihiko Ito, Kanagawa (JP); Tetsuo Maruyama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 111 days.

(21) Appl. No.: 14/104,220

(22) Filed: Dec. 12, 2013

(65) Prior Publication Data
US 2014/0185871 A1 Jul. 3, 2014

(30) Foreign Application Priority Data
Dec. 27, 2012 (JP) ................. 2012-285514

(51) Int. Cl.
*G06K 9/00* (2006.01)

(52) U.S. Cl.
CPC .................. *G06K 9/00671* (2013.01)

(58) Field of Classification Search
CPC .................................................. G06T 19/006
USPC ............................................... 382/103
See application file for complete search history.

(56) References Cited

U.S. PATENT DOCUMENTS

| | | | | |
|---|---|---|---|---|
| 6,678,425 B1 * | 1/2004 | Flores et al. | .................. | 382/289 |
| 6,935,562 B2 * | 8/2005 | Hecht et al. | ................... | 235/454 |
| 7,593,605 B2 * | 9/2009 | King | ..................... | G06K 9/228 382/229 |
| 2002/0191862 A1 * | 12/2002 | Neumann et al. | ............. | 382/284 |
| 2007/0242899 A1 * | 10/2007 | Satoh et al. | ..................... | 382/286 |
| 2008/0059570 A1 * | 3/2008 | Bill | ................ | 709/203 |
| 2008/0253656 A1 * | 10/2008 | Schwartzberg | ....... | G06K 9/3258 382/181 |
| 2008/0266323 A1 * | 10/2008 | Biocca | .................... | G06F 3/014 345/633 |
| 2009/0285484 A1 * | 11/2009 | Mallinson et al. | ............ | 382/183 |
| 2009/0286570 A1 * | 11/2009 | Pierce, Jr. | .................. | 455/556.1 |
| 2010/0309226 A1 * | 12/2010 | Quack et al. | .................. | 345/634 |
| 2011/0153341 A1 * | 6/2011 | Diaz-Cortes | ....................... | 705/2 |
| 2011/0287811 A1 * | 11/2011 | Mattila et al. | ................. | 455/566 |
| 2012/0093369 A1 * | 4/2012 | Ryu | .............................. | 382/103 |
| 2012/0135784 A1 * | 5/2012 | Lee | ....................... | G06T 19/006 455/556.1 |
| 2012/0224743 A1 * | 9/2012 | Rodriguez et al. | ............ | 382/103 |
| 2013/0124518 A1 * | 5/2013 | Ikenoue et al. | ............... | 707/736 |
| 2014/0009494 A1 * | 1/2014 | Kasahara | ...................... | 345/633 |

FOREIGN PATENT DOCUMENTS

JP 2012-155655 A 8/2012

* cited by examiner

*Primary Examiner* — Alex Liew
(74) *Attorney, Agent, or Firm* — Chip Law Group

(57) ABSTRACT

There is provided an information processing apparatus including a trigger recognition unit configured to acquire a captured image of a trigger and recognize predetermined trigger information included in the captured image, and a content acquisition unit configured to acquire a content including augmented reality information which is based on a state at a time of capturing the captured image or a state of content acquisition in a past and which corresponds to the predetermined trigger information recognized by the trigger recognition unit.

12 Claims, 26 Drawing Sheets

FIG. 4
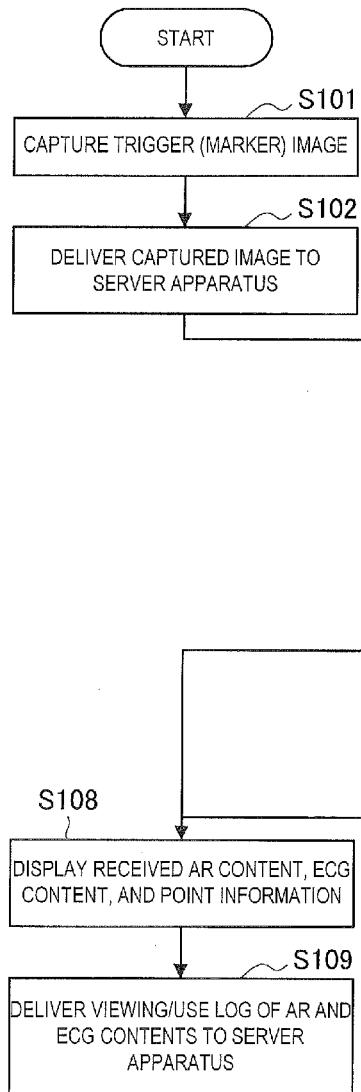
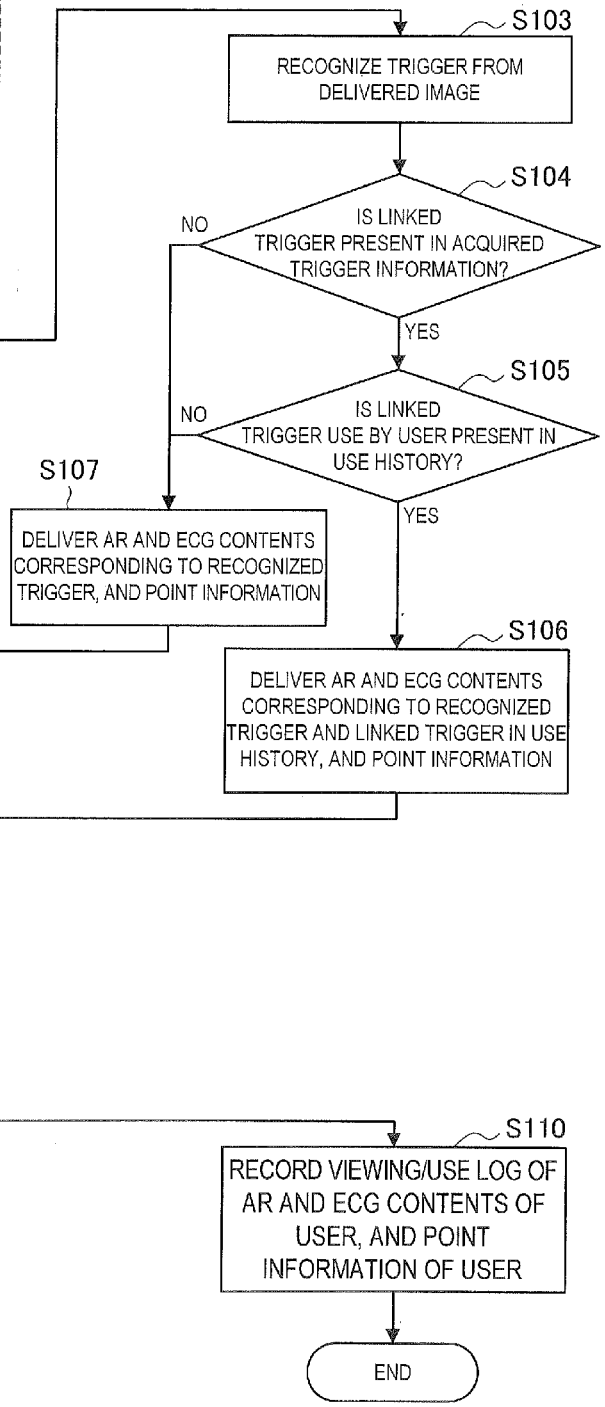

FIG. 5

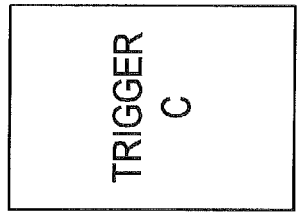

ID: T0003
TYPE: POSTER
CATEGORY: MOVIE INFORMATION
TITLE: ZZZ STORY
GENRE: FANTASY
AREA: N/A
PERIOD: 12/1/2013 TO 28/2/2013

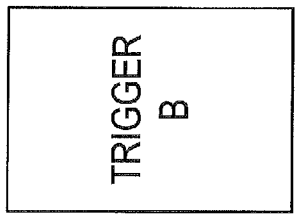

ID: T0002
TYPE: POSTER
CATEGORY: SIGHTSEEING INFORMATION
TITLE: XXX PREFECTURE SIGHTSEEING GUIDE
GENRE: SPORT
AREA: N/A
PERIOD: N/A

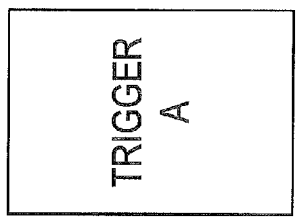

ID: T0001
TYPE: POSTER
CATEGORY: SIGHTSEEING INFORMATION
TITLE: XXX PREFECTURE SIGHTSEEING GUIDE
GENRE: GOURMET FOOD AND MEAL
AREA: YYY PREFECTURE
PERIOD: 1/1/2013 TO 31/3/2013

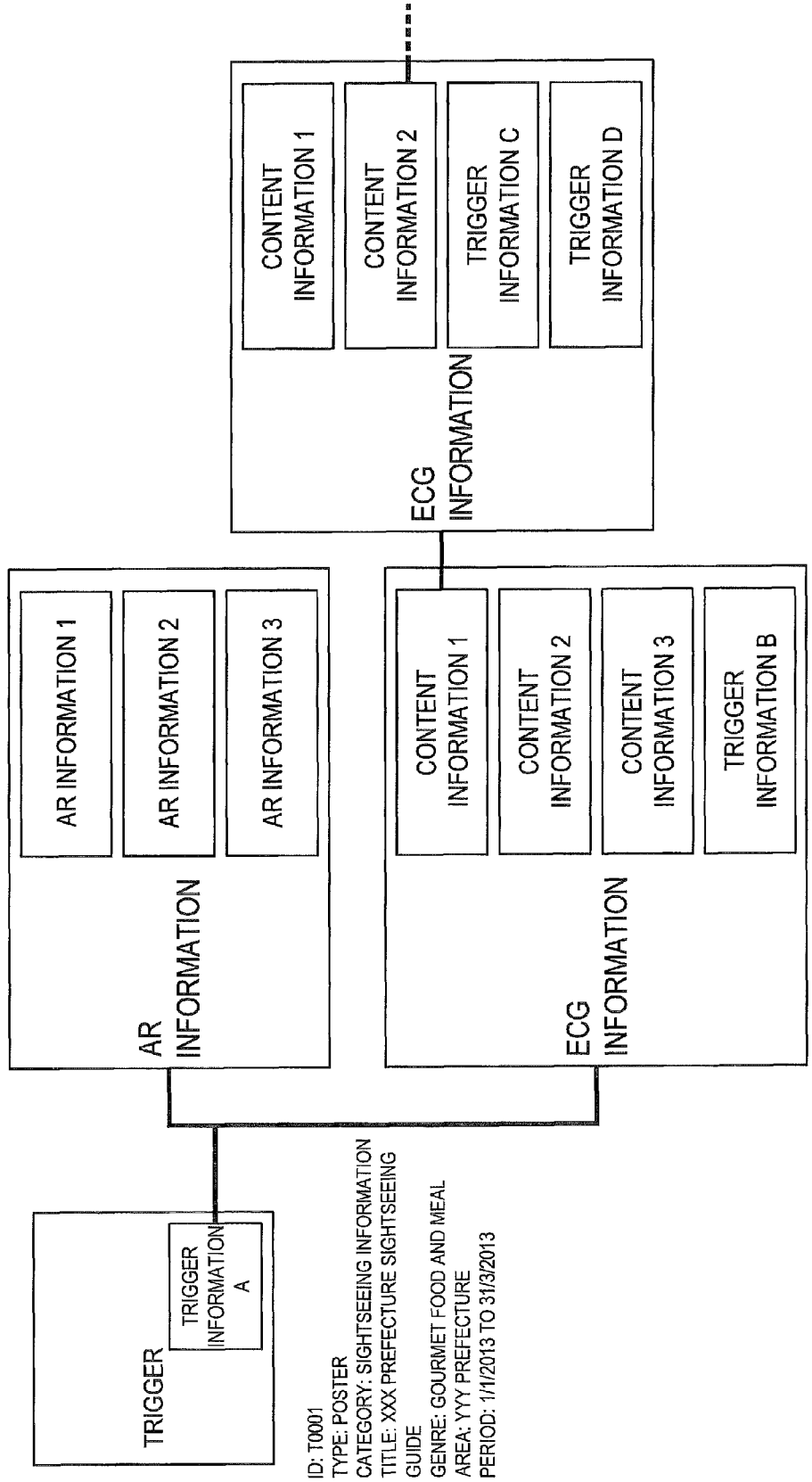

FIG. 11
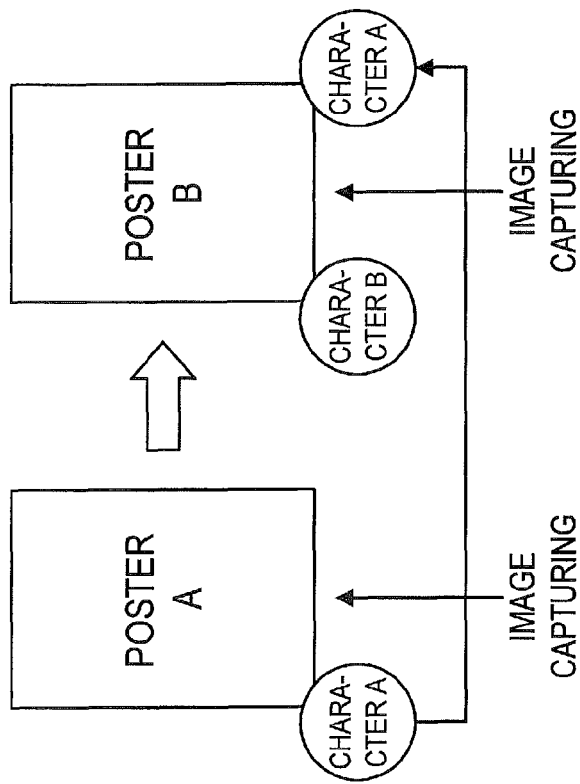
CASE OF USING AR SERVICE COLLECTIVELY FOR POSTERS A AND B
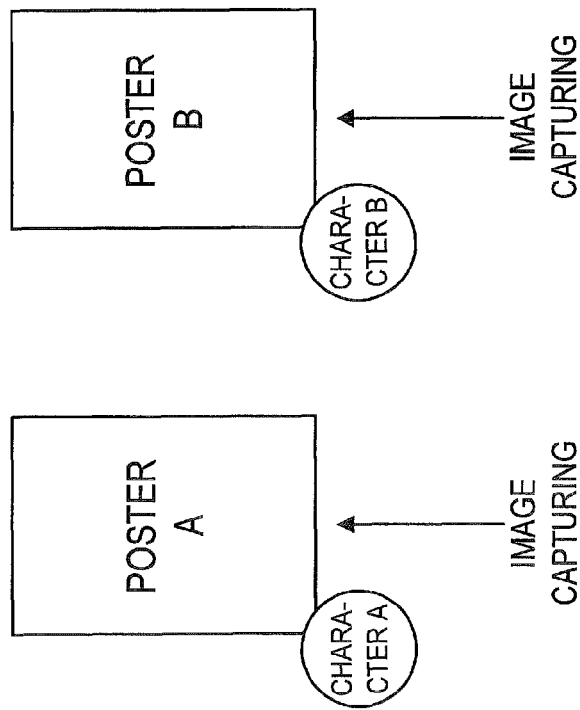
CASE OF USING AR SERVICES INDEPENDENTLY FIG. 12
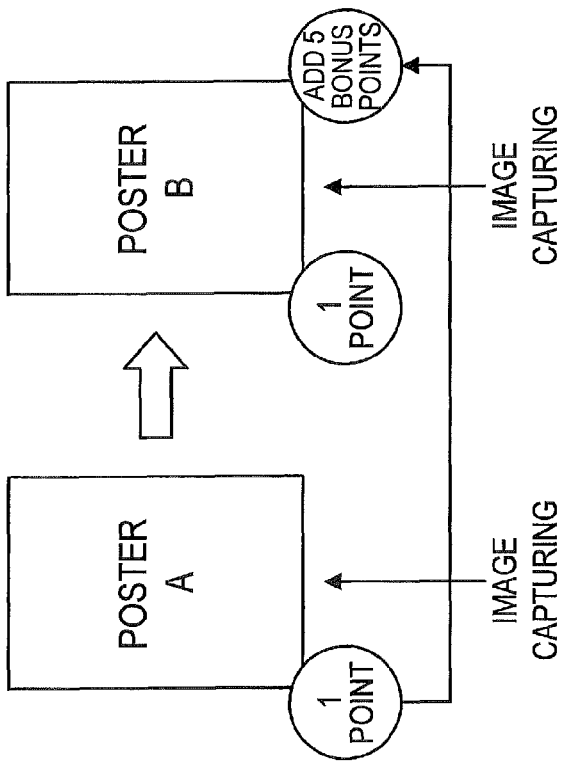
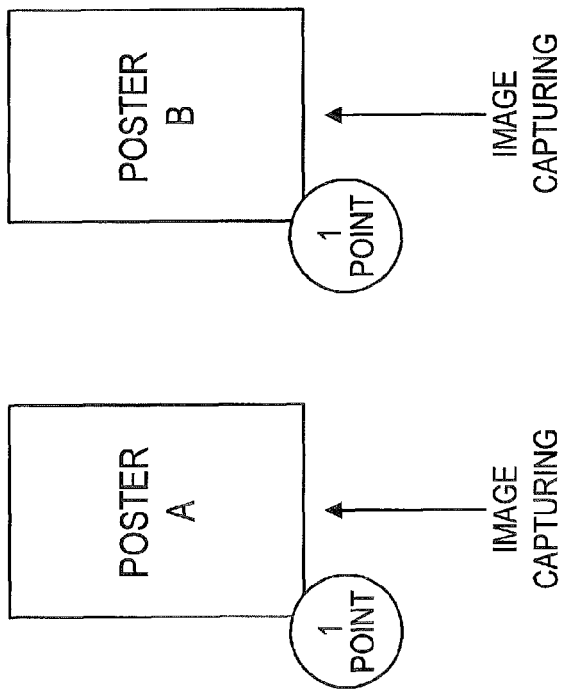

(2) TRIGGER (MARKER) IS RECOGNIZED

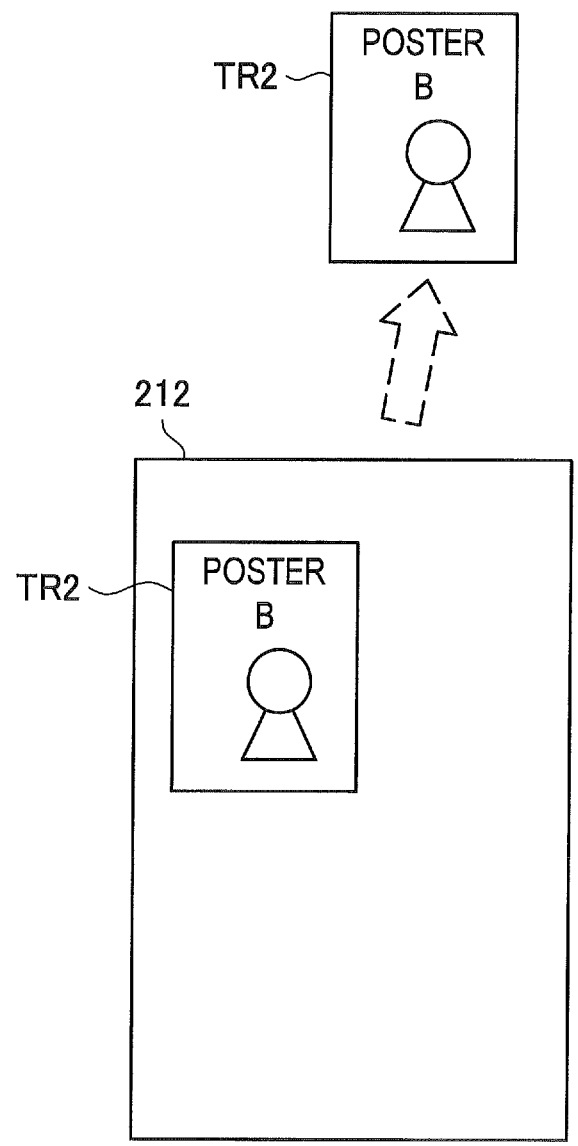

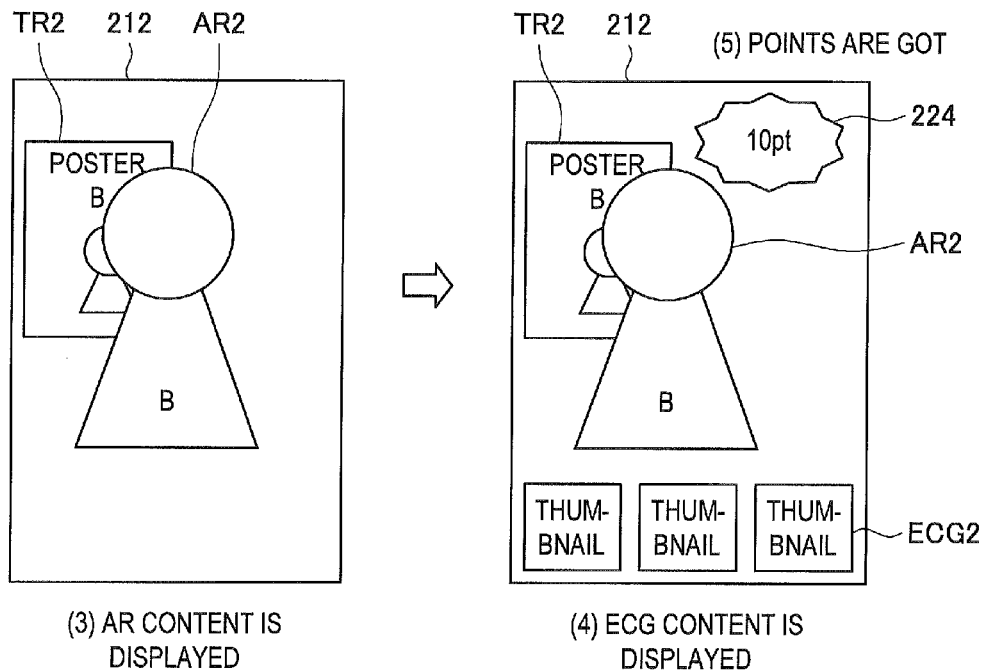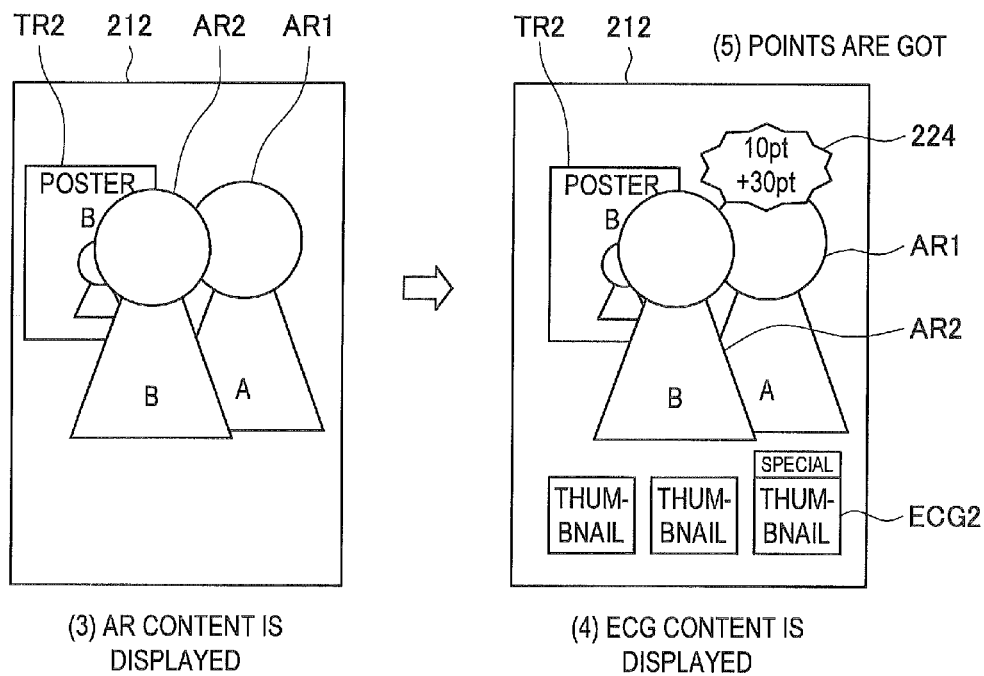

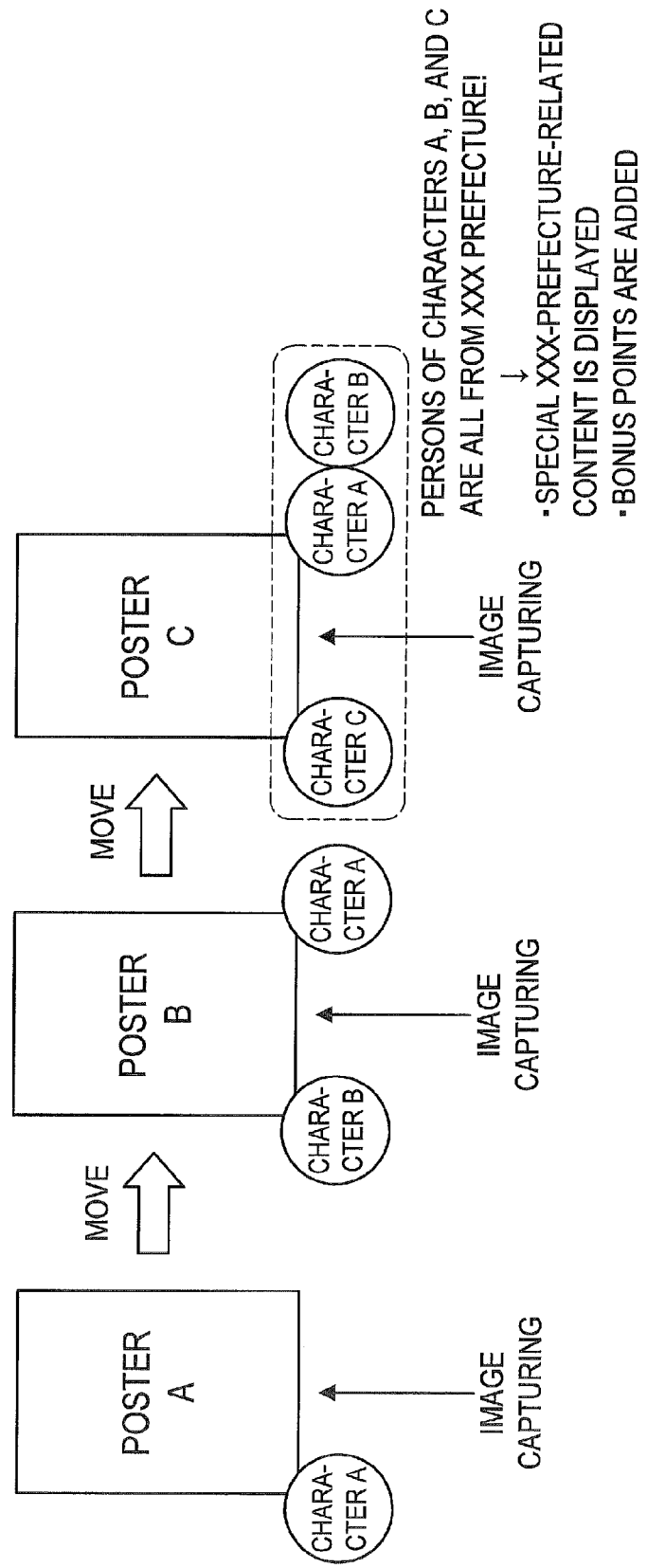

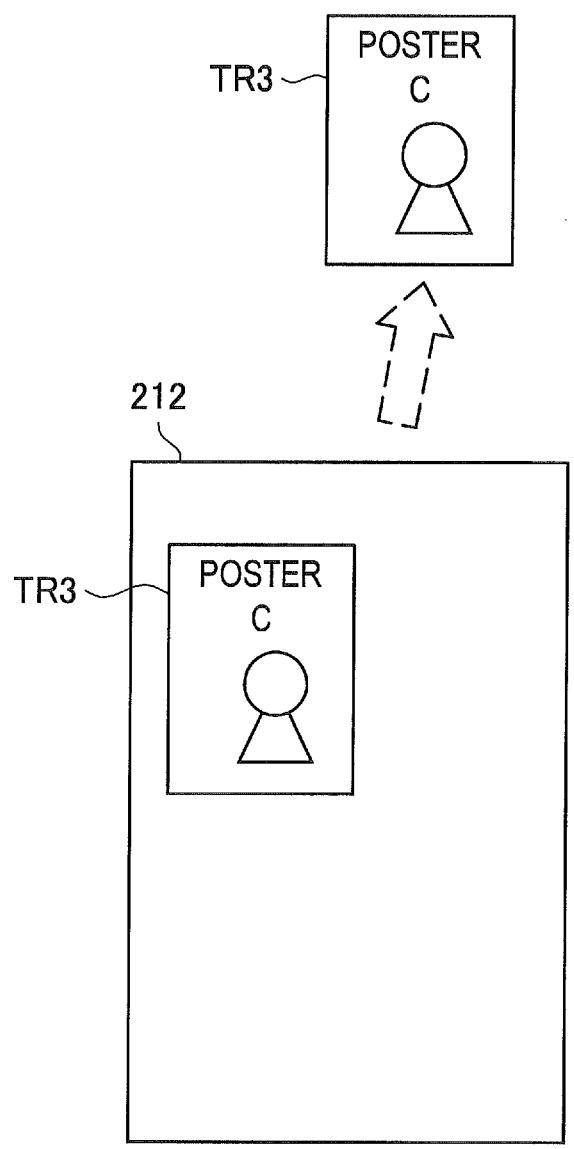

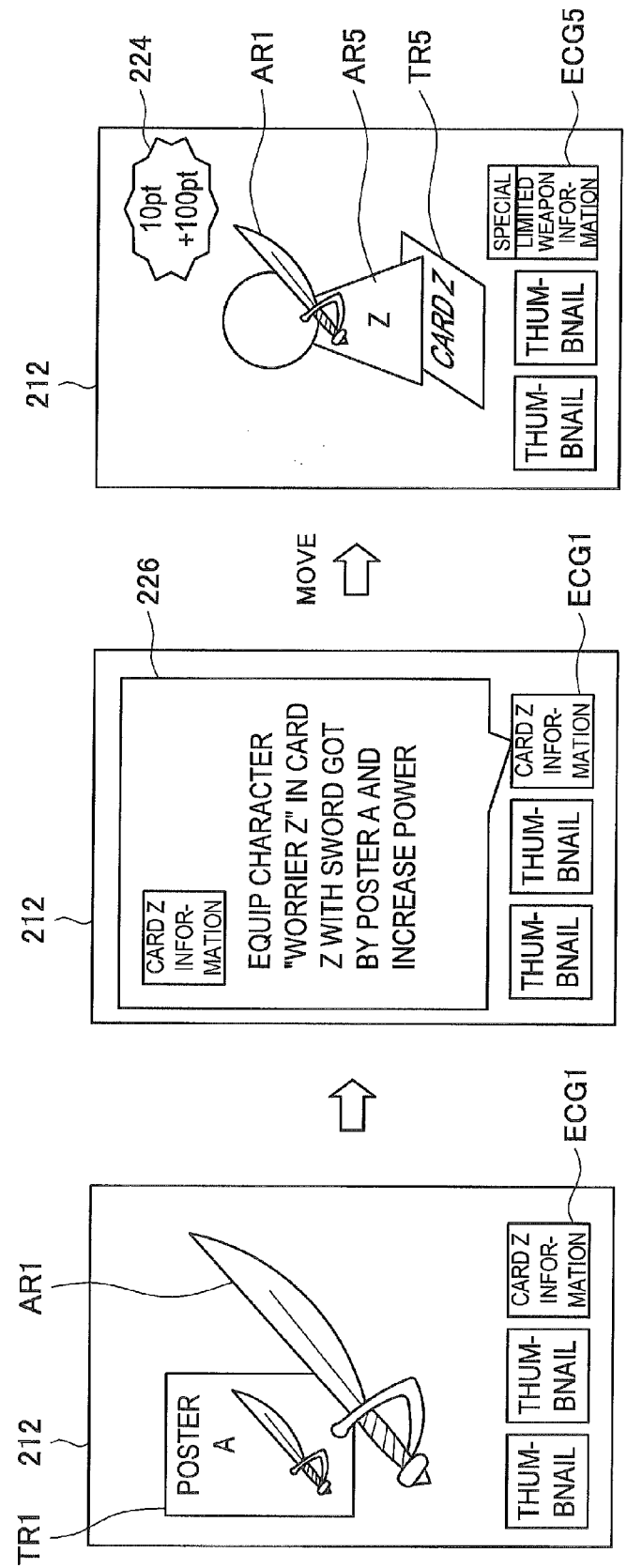

INFORMATION PROCESSING APPARATUS, CONTENT PROVIDING METHOD, AND COMPUTER PROGRAM

CROSS REFERENCE TO RELATED APPLICATIONS

This application claims the benefit of Japanese Priority Patent Application JP 2012-285514 filed Dec. 27, 2012, the entire contents of which are incorporated herein by reference.

BACKGROUND

The present disclosure relates to an information processing apparatus, a content providing method, and a computer program.

In recent years, image recognition technology has become sophisticated, and thus the location or posture of an object taken in an image inputted from a camera can be recognized by using image feature-amount matching. One of application examples of such object recognition is an AR (Augmented Reality) application (see JP 2012-155655A, for example). The AR application can display a variety of information (such as advertisement information, navigation information, and game information) in a superimposed manner in a taken image of a building, a road, or another object in the real world.

SUMMARY

When using the AR application, a user has to take an act of taking an image of a building, a road, or another object in the real world by using a camera. However, the act of taking an image by using a camera stresses the user. If the same information is displayed every time the AR application is used, the user feels it troublesome to use the AR application and stops using the AR application.

In light of the foregoing, it is desirable to provide an information processing apparatus, a content providing method, and a computer program, which are novel and improved, and which can encourage a user to use an AR application.

According to an embodiments of the present disclosure, there is provided an information processing apparatus including a trigger recognition unit configured to acquire a captured image of a trigger and recognize predetermined trigger information included in the captured image, and a content acquisition unit configured to acquire a content including augmented reality information which is based on a state at a time of capturing the captured image or a state of content acquisition in a past and which corresponds to the predetermined trigger information recognized by the trigger recognition unit.

According to an embodiments of the present disclosure, there is provided a content providing method including acquiring a captured image and recognizing predetermined trigger information included in the captured image, and acquiring a content including augmented reality information which is based on a state at a time of capturing the captured image or a state of content acquisition in a past and which corresponds to the predetermined trigger information recognized by a trigger recognition unit.

According to an embodiments of the present disclosure, there is provided a computer program for causing a computer to execute acquiring a captured image and recognizing predetermined trigger information included in the captured image, and acquiring a content including augmented reality information which is based on a state at a time of capturing the captured image or a state of content acquisition in a past and which corresponds to the predetermined trigger information recognized by a trigger recognition unit.

According to the embodiments of the present disclosure described above, it is possible to provide an information processing apparatus, a content providing method, and a computer program, which are novel and improved, and which can encourage a user to use an AR application.

BRIEF DESCRIPTION OF THE DRAWINGS

FIG. 4 is an explanatory diagram illustrating an operation example of the server apparatus 100 and the mobile terminal 200 according to an embodiment of the present disclosure;

FIG. 5 is an explanatory diagram illustrating examples of data managed by the AR-content information management database 106;

FIG. 6 is an explanatory diagram illustrating an example of unified information pieces associated with a trigger information piece;

FIG. 11 is an explanatory diagram illustrating a case where a plurality of triggers are linked;

FIG. 12 is an explanatory diagram illustrating a case where a plurality of triggers are linked;

FIG. 15 is an explanatory diagram illustrating an example where the server apparatus 100 provides the mobile terminal 200 with contents;

FIG. 16 is an explanatory diagram illustrating an example where the server apparatus 100 provides the mobile terminal 200 with contents;

FIG. 17 is an explanatory diagram illustrating an example where the server apparatus 100 provides the mobile terminal 200 with contents;

FIG. 18 is an explanatory diagram illustrating a case where a plurality of triggers are linked;

FIG. 19 is an explanatory diagram illustrating an example where the server apparatus 100 provides the mobile terminal 200 with contents;

FIG. 28 is an explanatory diagram illustrating an example where the server apparatus 100 provides the mobile terminal 200 with contents.

DETAILED DESCRIPTION OF THE EMBODIMENTS

Figure 1:
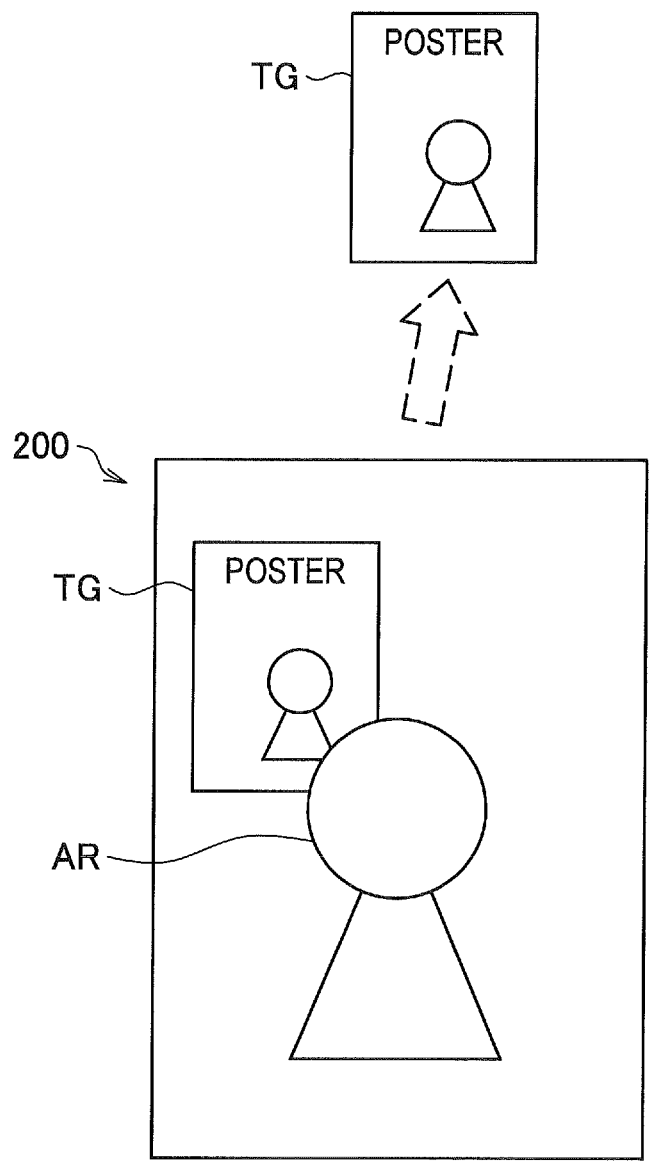
FIG. 1 is an explanatory diagram illustrating an outline of an AR-application-using system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the descriptions will be given in the following order.

<1. Embodiment of Present Disclosure>
[System Outline]
[Functional Configuration Example of Server Apparatus]
[Functional Configuration Example of Mobile Terminal]
[Operation Example of Server Apparatus and Mobile Terminal]
[Display Screen Examples of Mobile Terminal]
<2. Summarization>
<1. Embodiment of Present Disclosure>
[System Outline]

Firstly, an outline of an AR-application-using system according to an embodiment of the present disclosure will be described with reference to the drawings. FIG. 1 is an explanatory diagram illustrating an outline of an AR-application-using system according to an embodiment of the present disclosure. Hereinafter, the outline of the AR-application-using system according to an embodiment of the present disclosure will be described by using FIG. 1.

FIG. 1 schematically shows that an AR application is executed in a mobile terminal 200 which is a smartphone (multi-functional mobile phone), a PC (Personal Computer), a game terminal, a mobile music player, a wearable display, or the like. FIG. 1 illustrates a state where the mobile terminal 200 executing the AR application captures an image of a trigger TG for displaying an AR content AR by using an imaging apparatus such as a camera. In an example in FIG. 1, the trigger TG for displaying an AR content is a poster attached to a wall.

An image captured by the mobile terminal 200 is transmitted to, for example, a server apparatus not shown in FIG. 1, and is analyzed by the server apparatus. When recognizing the trigger TG by analyzing the image, the server apparatus provides the mobile terminal 200 with the AR content AR corresponding to the trigger TG.

As described above, by capturing an image of an object in the real world, an ordinary AR application displays any of various AR contents which corresponds to the object in such a manner as to superimpose the AR content on the object in the captured image. However, when the AR content corresponding to the image-captured object is simply displayed, a user can easily imagine what an AR content to be displayed is like. Such ease of imagination leads to less frequent use of the AR application by the user.

Hence, an embodiment of the present disclosure discloses and describes a technology of providing the mobile terminal 200 with a content including AR-content information which is based on a state at the time of capturing an image or a state of content acquisition in the past and which corresponds to information on an image-captured trigger.

The outline of the AR-application-using system according to an embodiment of the present disclosure has heretofore been described by using FIG. 1. Next, a description is given of a functional configuration example of a server apparatus according to an embodiment of the present disclosure.

[Functional Configuration Example of Server Apparatus]

Figure 2:
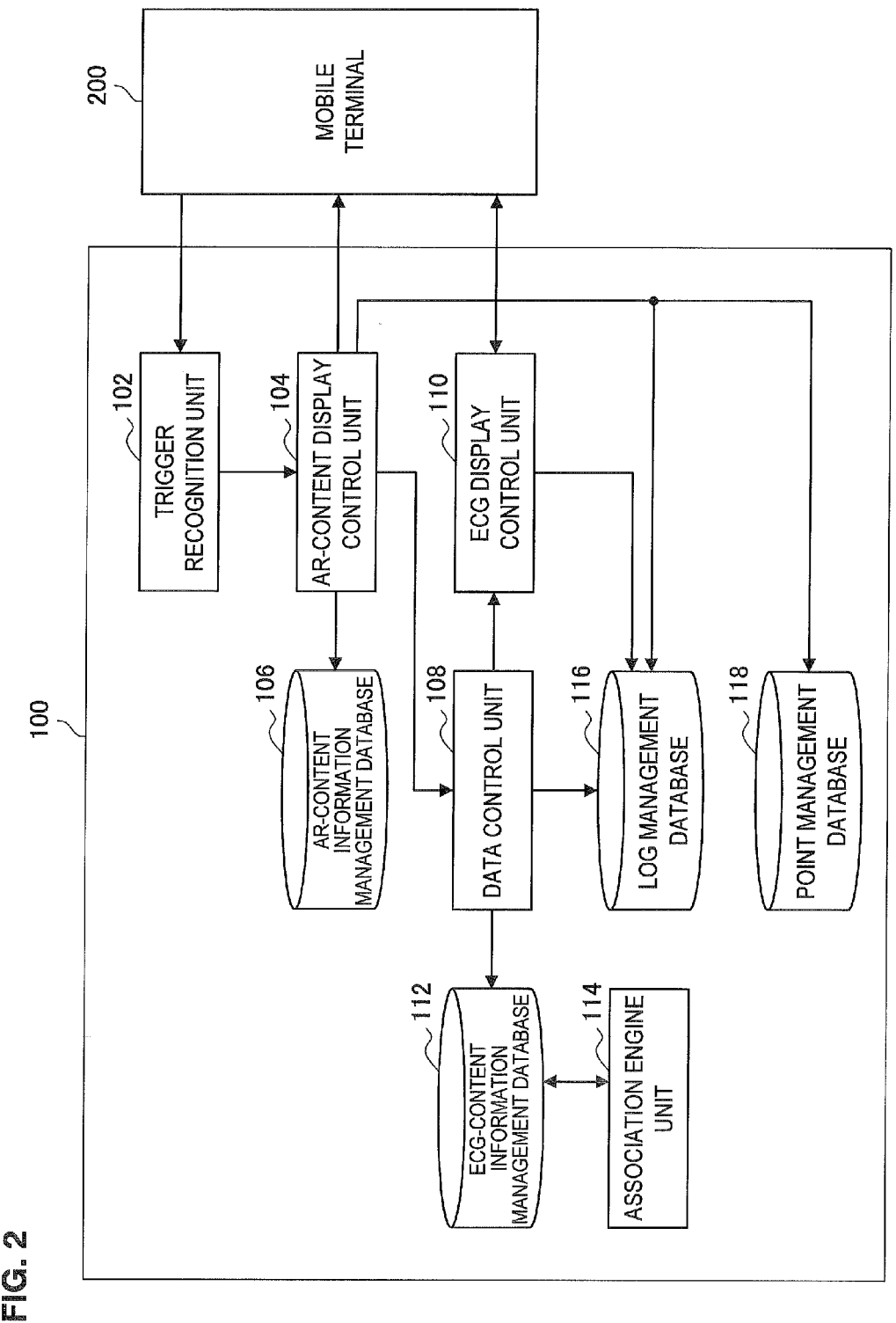
FIG. 2 is an explanatory diagram illustrating a functional configuration example of a server apparatus 100 according to an embodiment of the present disclosure.

FIG. 2 is an explanatory diagram illustrating a functional configuration example of a server apparatus 100 according to an embodiment of the present disclosure. Hereinafter, the functional configuration example of the server apparatus 100 according to an embodiment of the present disclosure will be described by using FIG. 2.

As illustrated in FIG. 2, the server apparatus 100 according to an embodiment of the present disclosure includes a trigger recognition unit 102, an AR-content display control unit 104, an AR-content information management database (DB) 106, a data control unit 108, an ECG (Electronic Content Guide) display control unit 110, an ECG-content information management database 112, an association engine unit 114, a log management database 116, and a point management database 118.

In the embodiments, an ECG refers to a content associated with a certain content, and particularly refers to a content associated with trigger information included in an image captured by the mobile terminal 200.

The trigger recognition unit 102 recognizes whether or not trigger information for displaying an AR content is present in the image captured by the mobile terminal 200. The trigger recognition unit 102 recognizes the presence of the trigger information, for example, depending on whether or not the image captured by the mobile terminal 200 includes information which matches trigger information set in advance. The trigger recognition unit 102 can recognize whether or not the trigger information is present in the image captured by the mobile terminal 200 by using an appropriate one of various image recognition technologies.

The AR-content display control unit 104 acquires an AR content corresponding to the trigger information recognized by the trigger recognition unit 102, from the AR-content information management database 106. The AR-content display control unit 104 provides the mobile terminal 200 with the AR content acquired from the AR-content information management database 106. The AR-content display control unit 104 also provides the mobile terminal 200 with a trigger ID corresponding to the trigger information recognized by the trigger recognition unit 102.

Here, by using location information, time information, and other condition information of the mobile terminal 200, the AR-content display control unit 104 determines an AR content to be acquired from the AR-content information management database 106. When acquiring the AR content corresponding to the trigger information recognized by the trigger recognition unit 102 from the AR-content information management database 106, the AR-content display control unit 104 determines an AR content to be acquired according to a state of content acquisition in the past. What AR content is acquired by the AR-content display control unit 104 will be described later in detail.

The AR-content display control unit 104 can also determine an AR content to be acquired from the AR-content information management database 106, by using information on an attribute (such as the age, generation, gender, or address) of the user of the mobile terminal 200. The AR-content display control unit 104 determines an AR content to be acquired from the AR-content information management database 106 by using the attribute of the user of the mobile terminal 200, and thereby can provide the mobile terminal 200 with the AR content matching the attribute of the user of the mobile terminal 200.

The AR-content information management database 106 is a database which manages information on an AR content to be superimposed on the image captured by the mobile terminal 200.

The data control unit 108 executes data control over an ECG content acquired from the ECG-content information management database 112 by the ECG display control unit 110 to be described later. The data control unit 108 refers to a log managed by the log management database 116 and executes the data control over the ECG content. The data control executed by the data control unit 108 may be, for example, filtering of the ECG content acquired from the ECG-content information management database 112 or cooperative processing with an SNS (Social Networking Service) or another service executed in conjunction with the AR application.

The ECG display control unit 110 acquires, from the ECG-content information management database 112, an ECG content corresponding to the trigger information recognized by the trigger recognition unit 102 and provides the mobile terminal 200 with the ECG content. When acquiring an ECG content from the ECG-content information management database 112, the ECG display control unit 110 uses the trigger ID provided to the mobile terminal 200 by the AR-content display control unit 104. When acquiring an ECG content from the ECG-content information management database 112, the ECG display control unit 110 may also use location information, date and time information, and other environment information of the mobile terminal 200. The ECG display control unit 110 provides the mobile terminal 200 with the ECG content by HTML (Hypertext Markup Language) generation or data provision using an API (Application Program Interface), for example.

The ECG display control unit 110 can determine an ECG content to be acquired from the ECG-content information management database 112, by using information on the attribute (such as the age, generation, gender, or address) of the user of the mobile terminal 200. The ECG display control unit 110 determines an ECG content to be acquired from the ECG-content information management database 112 by using the attribute of the user of the mobile terminal 200, and thereby can provide the mobile terminal 200 with the ECG content matching the attribute of the user of the mobile terminal 200.

The ECG-content information management database 112 is a database managing ECG contents. An ECG content corresponding to the trigger information recognized by the trigger recognition unit 102 is read from the ECG-content information management database 112 by the ECG display control unit 110 and provided to the mobile terminal 200.

The association engine unit 114 associates some of the ECG contents stored in the ECG-content information management database 112 with each other and unifies the ECG contents. Unified ECG contents will be described later in detail. The ECG display control unit 110 may acquire a unified ECG content stored in the ECG-content information management database 112 and may provide the mobile terminal 200 with the unified ECG content.

The log management database 116 is a database which manages logs of: the content of each ECG content provided by the ECG display control unit 110 to the mobile terminal 200; and the content of each ECG content selected by the mobile terminal 200. The point management database 118 is a database managing data on points used by the AR application.

The AR-content display control unit 104 and the ECG display control unit 110 illustrated in FIG. 2 can function as an example of a content acquisition unit in an embodiment of the present disclosure. In other words, the AR-content display control unit 104 and the ECG display control unit 110 can operate in such a manner as to acquire a content including an AR content which is based on a state at the time when the mobile terminal 200 captures an image or a state of content acquisition in the past and which corresponds to information on trigger information recognized by the trigger recognition unit 102.

With such a configuration as illustrated in FIG. 2, the server apparatus 100 according to an embodiment of the present disclosure can provide the mobile terminal 200 with the content including the AR-content information which is based on a state at the time of capturing an image of a trigger or a state of content acquisition in the past and which corresponds to information on an image-captured trigger.

The functional configuration example of the server apparatus 100 according to an embodiment of the present disclosure has heretofore been described by using FIG. 2. Next, a description is given of a functional configuration example of the mobile terminal 200 according to an embodiment of the present disclosure.

[Functional Configuration Example of Mobile Terminal]

Figure 3:
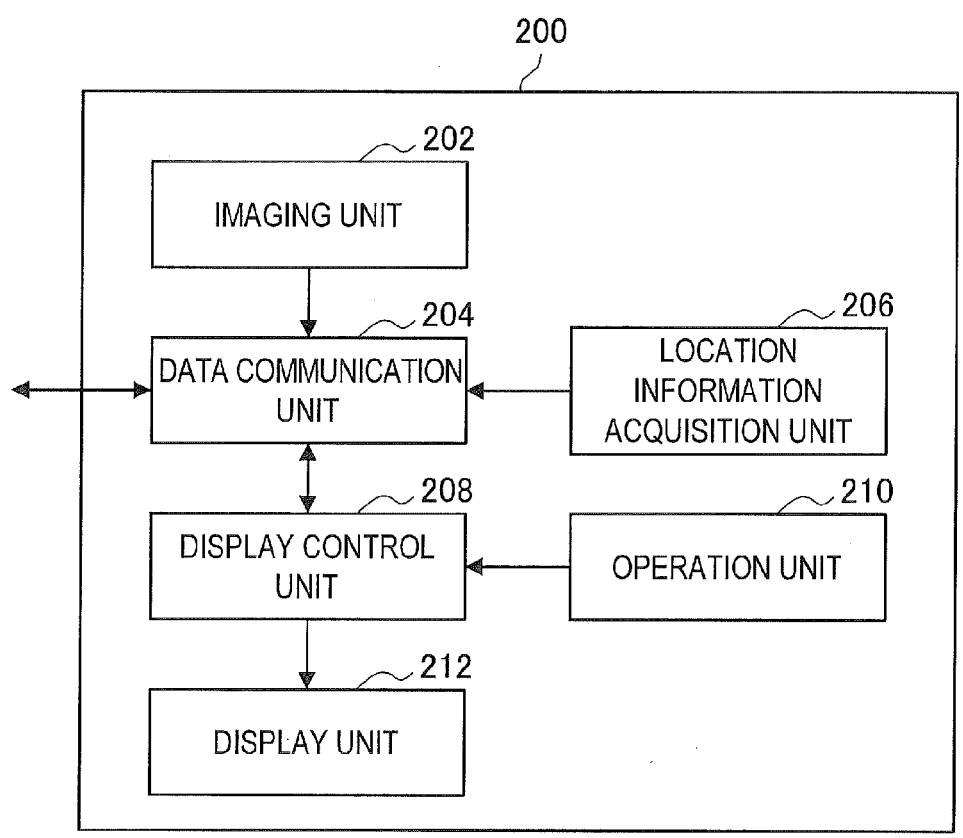
FIG. 3 is an explanatory diagram illustrating a functional configuration example of the mobile terminal 200 according to an embodiment of the present disclosure.

FIG. 3 is an explanatory diagram illustrating a functional configuration example of the mobile terminal 200 according to an embodiment of the present disclosure. Hereinafter, the functional configuration example of the mobile terminal 200 according to an embodiment of the present disclosure will be described by using FIG. 3.

As illustrated in FIG. 3, the mobile terminal 200 according to an embodiment of the present disclosure includes an imaging unit 202, a data communication unit 204, a location information acquisition unit 206, a display control unit 208, an operation unit 210, and a display unit 212.

The imaging unit 202 is a camera module having a lens and CCDs (Charge Coupled Devices), CMOSs (Complementary Metal Oxide Semiconductors), or other imaging devices. The imaging unit 202 captures an image of real space to thereby generate a series of input images. Each input image generated by the imaging unit 202 can be used not only for providing the AR application but also for estimating the location of the user and the location of an object taken in the input image. The imaging unit 202 may be configured separately from the mobile terminal 200 to be connected to the mobile terminal 200 when the AR application is provided.

The data communication unit 204 is a communication interface used by the mobile terminal 200 to communicate with another apparatus (for example, the server apparatus 100). The data communication unit 204 transmits an image captured by the imaging unit 202 to the server apparatus 100.

The data communication unit 204 receives an AR content and an ECG content transmitted from the server apparatus 100 and provides the display control unit 208 with the contents.

The location information acquisition unit 206 is a module configured to measure the location of the mobile terminal 200. The location information acquisition unit 206 may be, for example, a GPS (Global Positioning System) module configured to receive a GPS signal and measure the latitude, longitude, and altitude of the mobile terminal 200. Instead of the GPS module, the location information acquisition unit 206 may be a positioning module configured to measure the location of the mobile terminal 200 based on the intensity of a radio signal received from a radio access point. Information on the location of the mobile terminal 200 measured by the location information acquisition unit 206 can be transmitted to the server apparatus 100 by the data communication unit 204.

The display control unit 208 is configured of a CPU (Central Processing Unit), a DSP (Digital Signal Processor), or the like and controls information display in the display unit 212.

The operation unit 210 is used by the user of the mobile terminal 200 for operating the mobile terminal 200 or inputting information into the mobile terminal 200. The operation unit 210 can include, for example, a keypad, a button, a switch, a touch panel, and the like.

The display unit 212 is a display module having a screen configured to display a virtual object to be generated by the AR application and to be superimposed on an image of the real space. The display unit 212 may have a see-through or non-see-through screen. The display unit 212 may also be configured separately from the mobile terminal 200 to be connected to the mobile terminal 200 when the AR application is provided.

The functional configuration example of the mobile terminal 200 has heretofore been described by using FIG. 3. Next, a description is given of an operation example of the server apparatus 100 and the mobile terminal 200 according to an embodiment of the present disclosure.

[Operation Example of Server Apparatus and Mobile Terminal]

FIG. 4 is an explanatory diagram illustrating an operation example of the server apparatus 100 and the mobile terminal 200 according to an embodiment of the present disclosure. A flowchart in FIG. 4 illustrates an operation example in the following case. The mobile terminal 200 captures an image in the real space, and the server apparatus 100 acquires an AR content to be superimposed on the image and an ECG content associated with trigger information and provides the mobile terminal 200 with the AR and ECG contents. Hereinafter, a description is given of the operation example of the server apparatus 100 and the mobile terminal 200 according to an embodiment of the present disclosure by using FIG. 4.

Firstly, to acquire an AR content and an ECG content from the server apparatus 100, the mobile terminal 200 captures an image of a trigger (marker) which triggers display of the AR content, in accordance with the user operation (Step S101). Specifically, the mobile terminal 200 causes the imaging unit 202 to capture the image of the trigger (marker). The trigger (marker) triggering the display of the AR content may be, for example, a poster, a catalog, a pamphlet, a magazine article, a newspaper article, a flier, a card of a card game, a label of a commodity, or the like.

After capturing the image of the trigger (marker) triggering the display of the AR content in Step S101 above, the mobile terminal 200 subsequently transmits the captured image in Step S101 above to the server apparatus 100 (Step S102). When transmitting the image in Step S102, the mobile terminal 200 may transmit location information, time information, and other condition information of the mobile terminal 200 to the server apparatus 100 together with the captured image.

After the image captured by the mobile terminal 200 is transmitted to the server apparatus 100 in Step S102 above, the server apparatus 100 subsequently recognizes a trigger included in the image delivered from the mobile terminal 200 (Step S103). The trigger recognition in Step S103 is executed by the trigger recognition unit 102. Note that the following description assumes that the image delivered from the mobile terminal 200 includes the trigger.

After recognizing the trigger in the image delivered from the mobile terminal 200 and acquiring the trigger information in Step S103 above, the server apparatus 100 subsequently judges whether or not an linked trigger is present in the trigger information acquired in Step S103 above (Step S104). The judgment of whether or not an linked trigger is present in the trigger information acquired in Step S103 may be performed, for example, in such a manner that the AR-content display control unit 104 refers to the AR-content information management database 106.

FIG. 5 is an explanatory diagram illustrating examples of data managed by the AR-content information management database 106. For example, when the trigger recognition unit 102 recognizes that the mobile terminal 200 captures an image of a trigger A, the AR-content display control unit 104 acquires data associated with the trigger A from the AR-content information management database 106.

FIG. 5 illustrates an ID, a type, a title, a genre, an area, and a period of each trigger, as data managed by the AR-content information management database 106. The data is used in ECG content acquisition and filtering to be described later.

As illustrated in FIG. 5, data managed by the AR-content information management database 106 may include information on an area or a period. By managing the information on an area and a period, the server apparatus 100 can perform control so that the mobile terminal 200 is provided with an AR content only when the mobile terminal 200 captures an image of the trigger in a particular area and/or within a particular period, for example.

FIG. 6 is an explanatory diagram illustrating an example of unified information pieces associated with a trigger information piece. For example, as in FIG. 6, assume that the trigger information A is associated with an AR information piece and an ECG information piece which are unified. As in FIG. 6, the unified AR information piece associated with the trigger information A can include three AR information pieces. One of the three AR information pieces illustrated in FIG. 6 can be selected, depending on the condition at the time of trigger recognition.

In addition, as in FIG. 6, the unified ECG information piece associated with the trigger information A can include three content information pieces and one trigger information piece. At least one of the three content information pieces illustrated in FIG. 6 can be selected, depending on the condition at the time of trigger recognition. Moreover, as illustrated in FIG. 6, a content information piece can also be associated with further additional content information pieces and trigger information pieces. Such association can be performed by the association engine unit 114 illustrated in FIG. 2, for example.

As illustrated in FIG. 6, each additional trigger information piece can also be handled as an associated content information piece. In other words, when triggers are all posters, it is possible to provide such an ECG that introduces a certain poster from another poster.

The server apparatus 100 may manage a plurality of triggers associated with a certain trigger by unifying the triggers.

Figure 7:
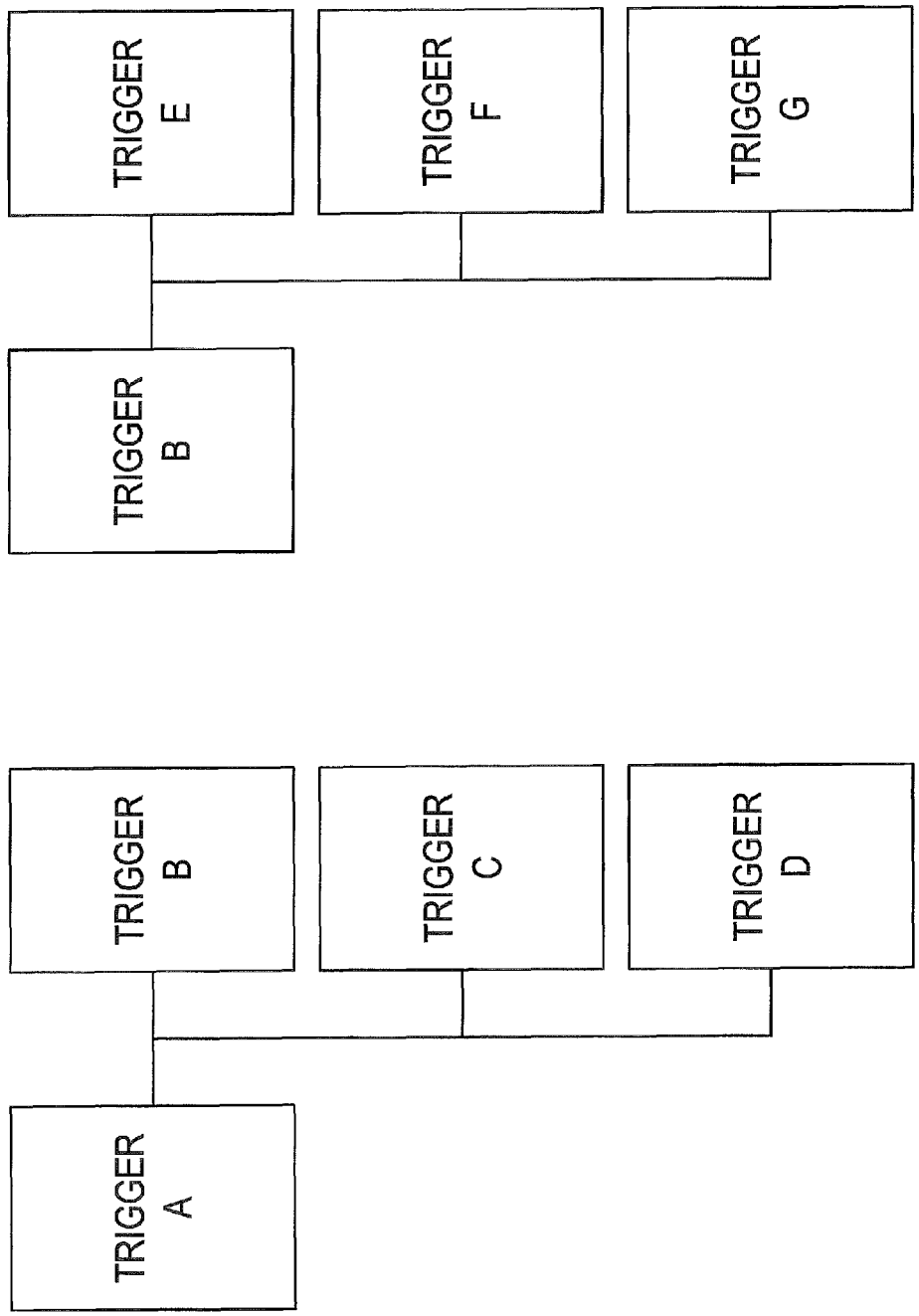
FIG. 7 is an explanatory diagram illustrating an example of unifying and managing a plurality of triggers.

FIG. 7 is an explanatory diagram illustrating an example of unifying and managing a plurality of triggers. FIG. 7 shows that information pieces of triggers B, C, and D are unified and managed as triggers associated with the trigger A and that information pieces of triggers E, F, and G are unified and managed as triggers associated with the trigger B. Such association can be performed by the association engine unit 114 illustrated in FIG. 2, for example.

When it is judged in Step S104 above that an linked trigger is present in the trigger information acquired in Step S103 above, the server apparatus 100 subsequently judges whether or not use of the linked trigger by the user using the AR application with the mobile terminal 200 is present in a use history (Step S105). Whether or not the use of the linked trigger is present in the use history may be judged, for example, in such a manner that the AR-content display control unit 104 refers to the log management database 116.

When it is judged in Step S105 above that the use of the linked trigger by the user using the AR application with the mobile terminal 200 is present in the use history, the server apparatus 100 subsequently delivers to the mobile terminal 200: an AR content and an ECG content corresponding to the trigger recognized in Step S103 above and the linked trigger in the use history; and point information (Step S106). The server apparatus 100 operates in such a manner that the AR-content display control unit 104 acquires the AR content and the ECG display control unit 110 acquires the ECG content and the point information.

On the other hand, when it is judged in Step S104 above that the linked trigger is not present in the trigger information acquired in Step S103 above, or when it is judged in Step S105 above that the use of the linked trigger by the user using the AR application with the mobile terminal 200 is not present in the use history, the server apparatus 100 subsequently delivers to the mobile terminal 200: an AR content and an ECG content corresponding to the trigger recognized in Step S103 above; and point information (Step S107).

When acquiring the ECG content to be provided to the mobile terminal 200, the server apparatus 100 may perform filtering of the ECG content by using data acquired from the AR-content information management database 106, a history of trigger image capturing by the user in the past, and a use history of ECG contents.

When the server apparatus 100 delivers the AR content, the ECG content, and the point information to the mobile terminal 200 in Step S106 or Step S107, the mobile terminal 200 displays in the display unit 212 the AR content, the ECG content, and the point information delivered from the server apparatus 100 (Step S108). The user of the mobile terminal 200 can view the AR content, the ECG content, and the point information displayed in the display unit 212 by the mobile terminal 200 and can use the displayed ECG content.

Figure 8:
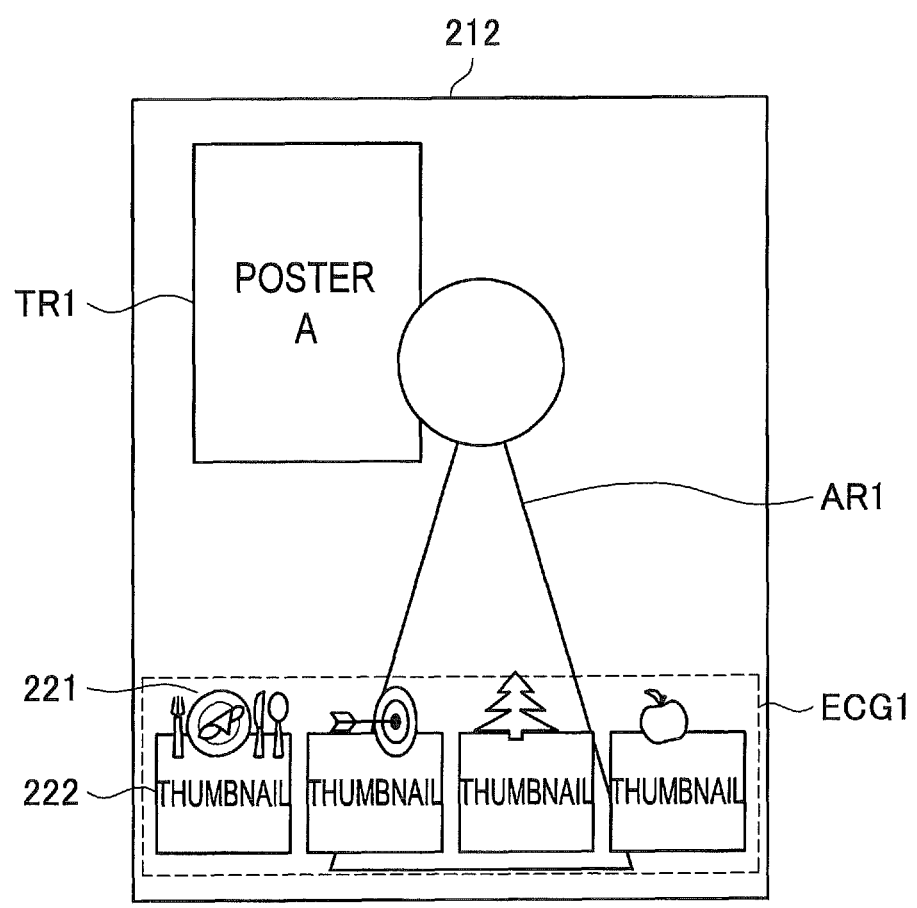
FIG. 8 is an explanatory diagram illustrating an example of a screen displayed in the display unit 212 of the mobile terminal 200 according to an embodiment of the present disclosure.

FIG. 8 is an explanatory diagram illustrating an example of a screen displayed in the display unit 212 of the mobile terminal 200 according to an embodiment of the present disclosure. FIG. 8 illustrates a state where the display unit 212 displays a trigger TR1 which is a trigger for displaying an AR content, an AR content AR1 displayed by capturing an image of the trigger TR1, and a unified ECG content ECG1 displayed by capturing the image of the trigger TR1. In the example in FIG. 8, the trigger TR1 is a poster, and the AR content AR1 is a person. Examples of material to be displayed as an AR content may include a character, a person, a material, a moving image, a still image, and text.

In the example in FIG. 8, four content information pieces are also displayed as the ECG content ECG1. Each information piece of the corresponding content includes an icon 221 indicating a genre of the information piece of the content and a thumbnail image 222 of the content. Examples of the genre of a content information piece may include gourmet food and meal, leisure, nature, a specialty, a person, and shopping.

The mobile terminal 200 causes the user to select one of the content information pieces displayed as the ECG content ECG1 and thereby can display the content corresponding to the content information piece in the display unit 212.

Figure 9:
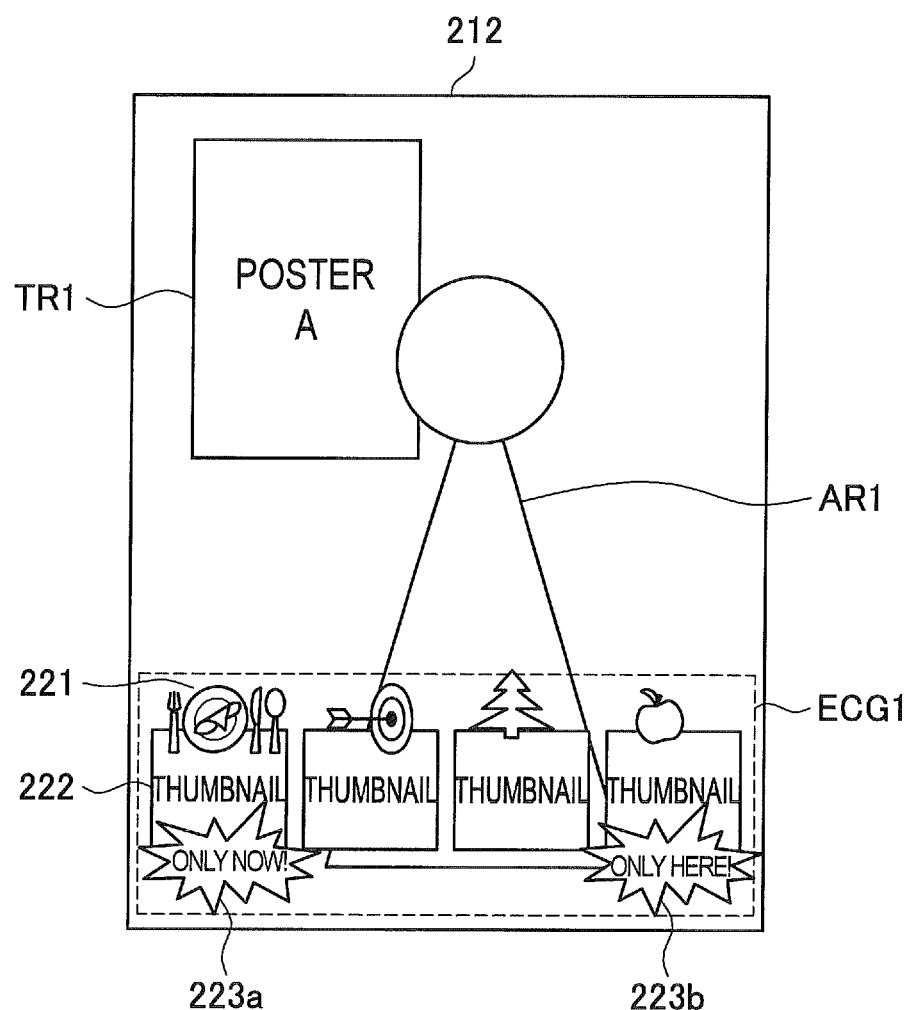
FIG. 9 is an explanatory diagram illustrating an example of a screen displayed in the display unit 212 of the mobile terminal 200 according to an embodiment of the present disclosure.

Here, there is shown an example of an ECG content displayed in the mobile terminal 200 in a case where a condition at the time when the mobile terminal 200 captures an image of the trigger TR1 satisfies a particular condition. FIG. 9 is an explanatory diagram illustrating an example of a screen displayed in the display unit 212 of the mobile terminal 200 according to an embodiment of the present disclosure. FIG. 9 illustrates a state where the display unit 212 displays the trigger TR1 which is a trigger for displaying an AR content, the AR content AR1 displayed by capturing an image of the trigger TR1, and the unified ECG content ECG1 displayed by capturing the image of the trigger TR1.

In the example in FIG. 9, four content information pieces are displayed as the ECG content ECG1. FIG. 9 also illustrates an information piece 223a and an information piece 223b which are displayed while being superimposed on the respective thumbnails because the mobile terminal 200 captures the image of the trigger TR1 in a particular time zone and in a particular place, respectively.

As described above, the server apparatus 100 can provide the mobile terminal 200 with an ECG content which can be provided only in the case where the condition at the time when the mobile terminal 200 captures an image of the trigger TR1 satisfies a particular condition.

After displaying the AR content, the ECG content, and the point information in the display unit 212, the mobile terminal 200 subsequently delivers a viewing/use log of AR and ECG contents to the server apparatus 100 (Step S109). The server apparatus 100 records the viewing/use log of the AR and ECG contents delivered from the mobile terminal 200 and the point information resulting from the use of the AR application (Step S110). The viewing/use log is managed by the log management database 116, while the point information is managed by the point management database 118.

By executing the operation as illustrated in FIG. 4, the server apparatus 100 according to an embodiment of the present disclosure can provide the mobile terminal 200 with a content including AR-content information which is based on a state at the time of capturing an image of a trigger or a state of content acquisition in the past and which corresponds to information on an image-captured trigger.

A trigger for displaying an AR content in the mobile terminal 200 can be linked with another trigger. Even though the mobile terminal 200 captures images of the same trigger, linking a plurality of triggers enables the server apparatus 100 to vary the AR content provided to the mobile terminal 200, based on a history of capturing the image in the past.

Figure 10:
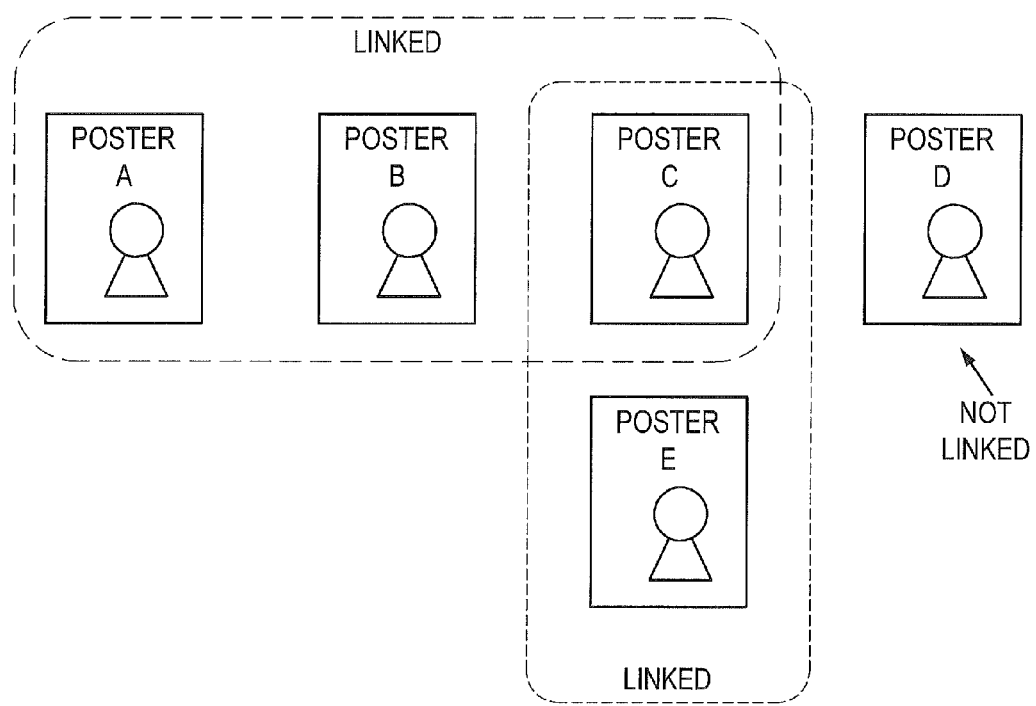
FIG. 10 is an explanatory diagram illustrating a case where a plurality of triggers are linked.

FIG. 10 is an explanatory diagram illustrating a case where a plurality of triggers are linked. FIG. 10 illustrates five posters as triggers. The poster A and posters B and C are linked, the poster C and a poster E are linked, and a poster D is not linked with any poster. The linkage relations are registered in the AR-content information management database 106 in advance.

To link the posters A, B, and C, an linkage condition that images of the three posters A, B, and C are captured randomly or only in a particular order may be registered in the AR-content information management database 106. In addition, the server apparatus 100 can perform adding an AR content, providing a special ECG content, providing bonus points, or the like, as a privilege to be provided when the linkage condition is satisfied in the trigger image capturing by the mobile terminal 200.

An example of providing bonus points will be described based on the case where the posters A, B, and C are linked. In a case of providing the mobile terminal 200 with 10 points every time an image is captured, the server apparatus 100 can provide the mobile terminal 200 with 30 bonus points in addition to the ordinary 10 points when a second image is captured. The server apparatus 100 can also provide the mobile terminal 200 with 50 bonus points in addition to the ordinary 10 points when a third image is captured.

Another example of providing bonus points will be described based on the case where the posters A, B, and C are linked. The server apparatus 100 can provide the mobile terminal 200 with bonus points relative to a distance between a place where the poster A is placed and a place where the poster B is placed.

Although FIG. 10 illustrates the plurality of posters as the example of linking a plurality of triggers, the linking may be performed based on not only a location but also time. Here, a case where an advertisement placed in a magazine is used as a trigger is taken as an example. In a case where the first advertisement and the second advertisement are placed in the October issue and the November issue, respectively, and where images of the two advertisements are captured in this order, the server apparatus 100 can provide the mobile terminal 200 with a privilege. In this case, the server apparatus 100 can provide the mobile terminal 200 with the privilege, only if the mobile terminal 200 captures the image of the advertisement placed in the October issue and acquires an AR content corresponding to the advertisement by the publication date of the November issue. The privilege is provided when the mobile terminal 200 captures the image of the advertisement placed in the November issue. Temporally linking the plurality of triggers as described above can lead to expectation of an advantageous effect that increases motivation of the user of the mobile terminal 200 to continuously purchase the magazine and capture images of advertisements placed in the magazine.

There is shown another example of the case where a plurality of triggers are linked. FIG. 11 is an explanatory diagram illustrating the case where a plurality of triggers are linked. FIG. 11 illustrates the posters A and B as triggers. When the mobile terminal 200 captures an image of the poster A, the server apparatus 100 provides the mobile terminal 200 with a character A as an AR content. When the mobile terminal 200 captures an image of the poster B, the server apparatus 100 provides the mobile terminal 200 with a character B as an AR content.

When the user of the mobile terminal 200 captures images of the poster A and the poster B, respectively, to use AR services independently from each other, the server apparatus 100 provides the mobile terminal 200 with the characters A and B, respectively, as AR contents. In contrast, assume that the mobile terminal 200 captures an image of the poster A, the server apparatus 100 provides the mobile terminal 200 with the character A as an AR content, and thereafter the mobile terminal 200 captures an image of the poster B. In this case, the server apparatus 100 provides the mobile terminal 200 with the character B as an AR content in addition to the character A. In other words, the character A provided from the server apparatus 100 by the image capturing of the poster A can accompany the user of the mobile terminal 200, when the image of the poster B is captured.

Note that the order of capturing the images of the posters A and B may be a random order or may be limited to a particular order. For example, only in the case where the image of the poster B is captured after the image of the poster A is captured, the server apparatus 100 may provide the mobile terminal 200 with the characters A and B as the AR contents when the image of the poster B is captured. In the case where the image of the poster A is captured after the image of the poster B is captured, the server apparatus 100 may provide the mobile terminal 200 with only the character A when the image of the poster A is captured.

FIG. 12 is an explanatory diagram illustrating a case where a plurality of triggers are linked. FIG. 12 illustrates the posters A and B as triggers. When the mobile terminal 200 captures an image of the poster A, the server apparatus 100 provides the mobile terminal 200 with one point as an ordinary point. When the mobile terminal 200 captures an image of the poster B, the server apparatus 100 provides the mobile terminal 200 with one point as the ordinary point.

When the user of the mobile terminal 200 captures the images of the poster A and the poster B, respectively, to use AR services independently from each other, the server apparatus 100 provides the mobile terminal 200 with the ordinary points only. In contrast, assume that the mobile terminal 200 captures an image of the poster A, the server apparatus 100 provides the mobile terminal 200 with an ordinary point, and thereafter the mobile terminal 200 captures an image of the poster B. In this case, the server apparatus 100 provides the mobile terminal 200 with bonus points in addition to the ordinary point. In the example in FIG. 12, when the mobile terminal 200 captures the image of the poster B after capturing the image of the poster A, the server apparatus 100 provides five bonus points in addition to the one ordinary point.

Note that that the order of capturing the images of the posters A and B may be a random order or may be limited to a particular order. For example, only in the case where the image of the poster B is captured after the image of the poster A is captured, the server apparatus 100 may provide the mobile terminal 200 with five bonus points when the image of the poster B is captured. In the case where the image of the poster A is captured after the image of the poster B is captured, the server apparatus 100 may provide the mobile terminal 200 with only the ordinary point when the image of the poster A is captured.

Figure 13:
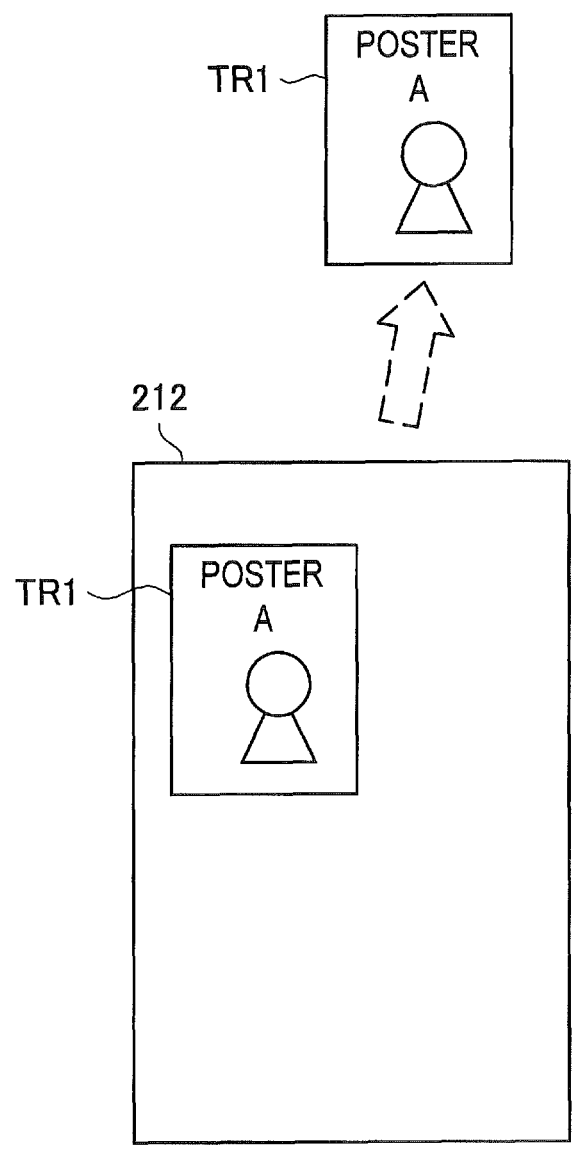
FIG. 13 is an explanatory diagram illustrating an example where the server apparatus 100 provides the mobile terminal 200 with contents.
Figure 14:
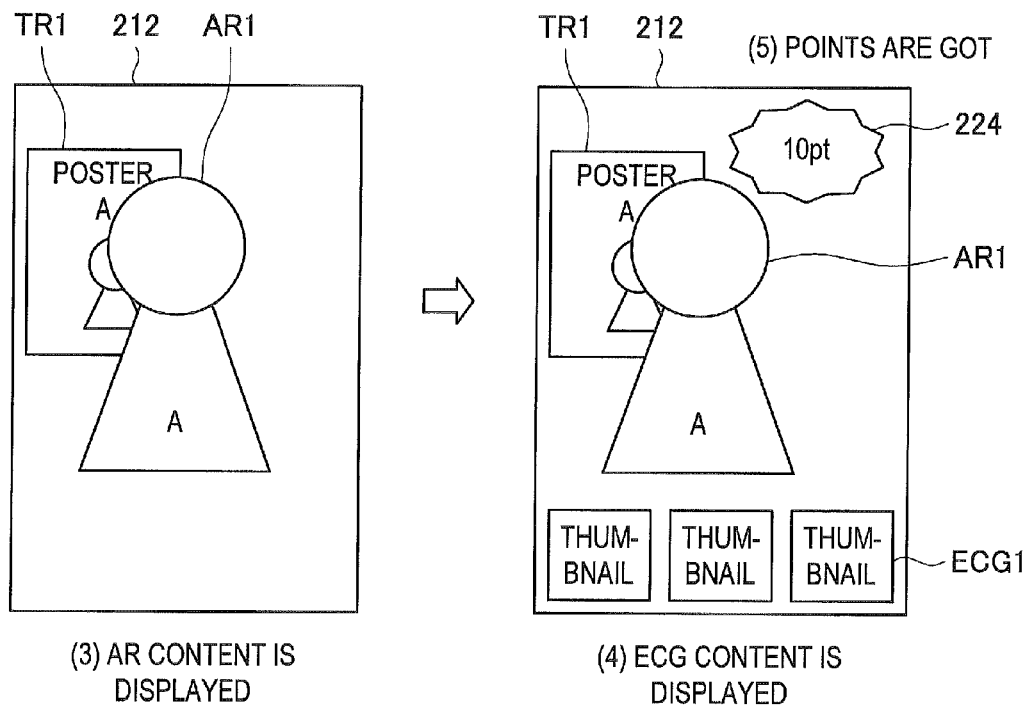
FIG. 14 is an explanatory diagram illustrating an example where the server apparatus 100 provides the mobile terminal 200 with contents.

FIGS. 13 and 14 are explanatory diagrams illustrating an example where the server apparatus 100 provides the mobile terminal 200 with contents. FIGS. 13 and 14 illustrate screens displayed in the mobile terminal 200 in time series when the mobile terminal 200 for the first time captures an image of the trigger TR1 which is the poster A.

Firstly, the mobile terminal 200 captures the image of the trigger TR1 by using the imaging unit 202 to acquire a content from the server apparatus 100. FIG. 13 shows that the image captured by the imaging unit 202 is displayed in real time in the display unit 212. The image captured by the imaging unit 202 is transmitted to the server apparatus 100, and the server apparatus 100 recognizes the trigger. When recognizing that the mobile terminal 200 captures the image of the trigger TR1, the server apparatus 100 provides the mobile terminal 200 with an AR content and an ECG content which correspond to the trigger TR1, and point information of the user of the mobile terminal 200.

FIG. 14 shows that the display unit 212 displays: the AR content AR1 corresponding to the trigger TR1; and further the ECG content ECG1 corresponding to the trigger TR1 and point information 224 of the user of the mobile terminal 200. Note that FIG. 14 shows that the AR content AR1 is displayed and that the ECG content ECG1 and the point information 224 are thereafter displayed, but the embodiment of the present disclosure is not limited to the example. The display unit 212 may simultaneously display the AR content AR1, the ECG content ECG1, and the point information 224. Alternatively, the display unit 212 may display the AR content AR1 after displaying the ECG content ECG1 and the point information 224.

FIGS. 15 and 16 are explanatory diagrams illustrating an example where the server apparatus 100 provides the mobile terminal 200 with contents. FIGS. 15 and 16 illustrate screens displayed in the mobile terminal 200 in time series when the mobile terminal 200 for the first time captures an image of a trigger TR2 which is the poster B. Note that in the example illustrated in FIGS. 15 and 16, the mobile terminal 200 has not yet captured an image of the poster A linked with the poster B.

When the mobile terminal 200 for the first time captures the image of the trigger TR2 which is the poster B, the same processing is performed as in the case where as described above the mobile terminal 200 captures for the first time the image of the trigger TR1 which is the poster A. In other words, as illustrated in FIG. 15, when the mobile terminal 200 captures the image of the trigger TR2 to acquire a content from the server apparatus 100, the server apparatus 100 recognizes that the mobile terminal 200 captures the image of the trigger TR2, and provides the mobile terminal 200 with an AR content and an ECG content which correspond to the trigger TR2 and point information of the user of the mobile terminal 200.

Then, as illustrated in FIG. 16, the display unit 212 displays: an AR content AR2 corresponding to the trigger TR2; and further an ECG content ECG2 corresponding to the trigger TR2 and the point information 224 of the user of the mobile terminal 200.

FIG. 17 is an explanatory diagram illustrating an example where the server apparatus 100 provides the mobile terminal 200 with contents. FIG. 17 illustrates an example where the poster A and the poster B are linked and where the mobile terminal 200 captures an image of the poster A, is thereby provided with a content, and then captures an image of the poster B.

In the case where the poster A and the poster B are linked as illustrated in FIG. 17 and where a history shows that the mobile terminal 200 has captured the image of the poster A and been provided with a content, when the mobile terminal 200 captures the image of the poster B, the server apparatus 100 provides the mobile terminal 200 with: the AR content AR1 having been provided to the mobile terminal 200 at the time of capturing the image of the poster A; and the AR content AR2 corresponding to the trigger TR2. Also in the case where the poster A and the poster B are linked as illustrated in FIG. 17 and where a history shows that the mobile terminal 200 has captured the image of the poster A and been provided with a content, when the mobile terminal 200 captures the image of the poster B, the server apparatus 100 also provides the mobile terminal 200 with a special ECG content ECG2 and bonus points.

linking the triggers in this manner enables the server apparatus 100 to vary contents provided to the mobile terminal 200 depending on the trigger image capturing by the mobile terminal 200. Variation of the contents provided by the server apparatus 100 can lead to high expectation of the following advantageous effect. The user of the mobile terminal 200 looks forward to a content to be provided by capturing an trigger image, and has increased motivation to capture an image of a trigger.

FIG. 18 is an explanatory diagram illustrating a case where a plurality of triggers are linked. FIG. 18 illustrates the posters A, B, and C as triggers. When the mobile terminal 200 captures images of the posters A, B, and C, respectively, the server apparatus 100 provides the mobile terminal 200 with the characters A and B, and a character C as AR contents, respectively. In addition, the characters A, B, and C are all from the same prefecture, and the server apparatus 100 registers this.

When the mobile terminal 200 captures the image of the poster A, is provided with the content from the server apparatus 100, and thereafter captures the image of the poster B, the server apparatus 100 provides the mobile terminal 200 with the characters A and B as the AR contents. Then, when the mobile terminal 200 captures the image of the poster C with the history of being provided with the characters A and B as the AR contents, the server apparatus 100 provides the mobile terminal 200 with the characters A, B, and C as the AR contents.

Since the characters A, B, and C are all from the same prefecture, the server apparatus 100 may provide the mobile terminal 200 with a special content related to the prefecture and bonus points when providing the mobile terminal 200 with the characters A, B, and C as the AR contents.

Figure 20:
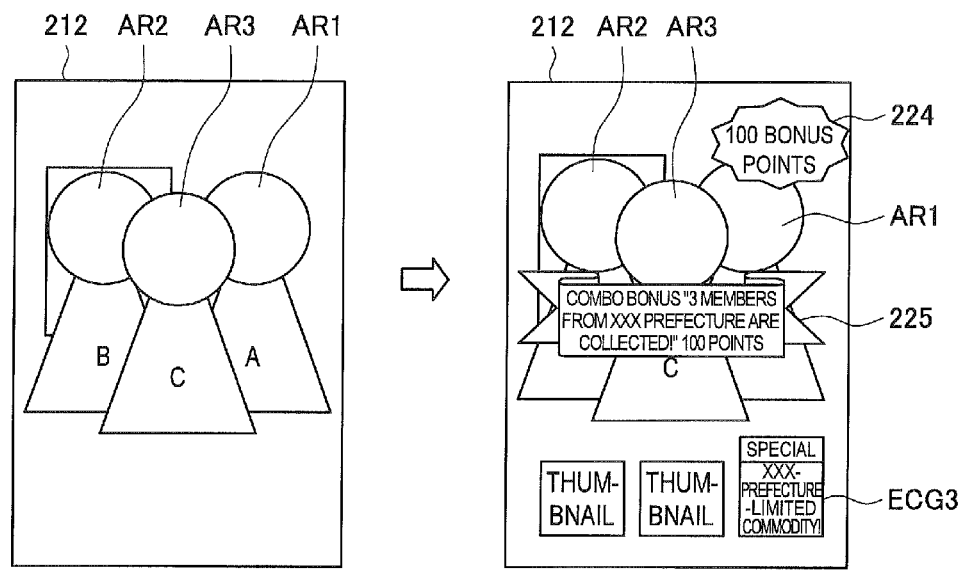
FIG. 20 is an explanatory diagram illustrating an example where the server apparatus 100 provides the mobile terminal 200 with contents.

FIGS. 19 and 20 are explanatory diagrams illustrating an example where the server apparatus 100 provides the mobile terminal 200 with contents. FIGS. 19 and 20 illustrate screens displayed in the mobile terminal 200 in time series when the mobile terminal 200 for the first time captures an image of a trigger TR3 which is the poster C. Here, the following description assumes that before the mobile terminal 200 captures the image of the trigger TR3 which is the poster C as in FIGS. 19 and 20, the mobile terminal 200 has captured the images of the posters A and B and been provided with contents from the server apparatus 100 as illustrated in FIG. 18.

The mobile terminal 200 captures the image of the trigger TR3 by using the imaging unit 202 to acquire contents from the server apparatus 100. FIG. 19 shows that the display unit 212 displays the image captured by the imaging unit 202 in real time. The image captured by the imaging unit 202 is transmitted to the server apparatus 100, and the server apparatus 100 recognizes the trigger. When recognizing that the mobile terminal 200 captures the image of the trigger TR3, the server apparatus 100 provides the mobile terminal 200 with an AR content and an ECG content which correspond to the trigger TR3 and point information of the user of the mobile terminal 200.

In addition to the contents corresponding to the trigger TR3 and the like, the server apparatus 100 provides the characters A and B as AR contents based on a history of providing contents to the mobile terminal 200. FIG. 20 illustrates a state where the display unit 212 displays as the AR contents the AR contents AR1 and AR2, and an AR content AR3 which correspond to the characters A, B, and C, respectively.

In addition, since the characters A, B, and C are all from the same prefecture, the server apparatus 100 provides the mobile terminal 200 with a special content related to the prefecture and bonus points. In the state illustrated in FIG. 20, the display unit 212 displays: an ECG content ECG3 related to the home prefecture of the characters A, B, and C; and the point information 224 indicating provision of the bonus points resulting from collecting the characters A, B, and C.

Also in the state illustrated in FIG. 20, the display unit 212 displays bonus point information 225 indicating that the bonus points are provided by the server apparatus 100, the bonus points resulting from the collecting three characters who are from the same prefecture.

linking triggers based on characteristics of characters in this manner enables the server apparatus 100 to vary contents provided to the mobile terminal 200 depending on the trigger image capturing by the mobile terminal 200. In particular, as illustrated in FIGS. 19 and 20, providing a privilege based on acquisition of an AR content satisfying a particular condition can lead to high expectation of the advantageous effect that the server apparatus 100 can increase motivation of the user of the mobile terminal 200 to capture an image of a trigger.

Various patterns are conceivable for linking triggers based on characteristics of characters. For example, when the mobile terminal 200 captures images of particular five posters as AR contents among ten posters corresponding to different characters, respectively, the server apparatus 100 can operate in such a manner as to provide the mobile terminal 200 with a privilege. The server apparatus 100 can operate in such a manner as to provide the privilege only when the mobile terminal 200 captures images of all of the ten posters. However, when the user is caused to capture images of all the posters, this might lead to decreased motivation for trigger image capturing. Thus, the server apparatus 100 may operate in such a manner as to provide the privilege of the mobile terminal 200 even though the mobile terminal 200 does not capture images of all of the ten posters. In linking triggers based on characteristics of characters, various other patterns can be provided, such as persons belonging to the same group, characters appearing in the same work, characters using a motif of the same animal, and persons of the same age.

Figure 21:
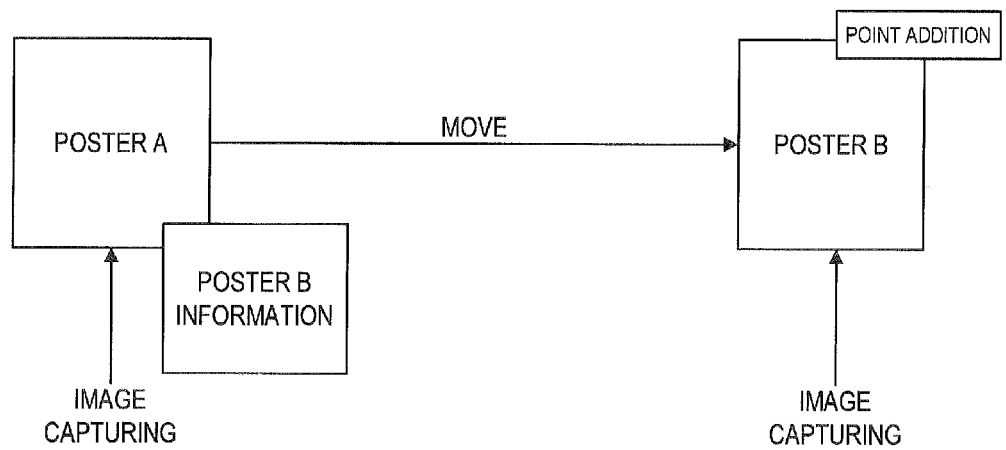
FIG. 21 is an explanatory diagram illustrating a case where a plurality of triggers are linked.

FIG. 21 is an explanatory diagram illustrating a case where a plurality of triggers are linked. FIG. 21 illustrates the posters A and B as triggers. When the mobile terminal 200 captures images of the posters A and B, respectively, the server apparatus 100 provides the mobile terminal 200 with the characters A and B as AR contents, respectively.

FIG. 21 also shows that when the mobile terminal 200 captures the image of the poster A, the server apparatus 100 provides, as an ECG content, information of the poster B which is a different trigger from the poster A. As described above, the server apparatus 100 can provide a content in response to trigger image capturing by the mobile terminal 200 while including information of another trigger in the content. Note that by using information acquired by the location information acquisition unit 206, the server apparatus 100 can acquire the location of trigger image capturing by the mobile terminal 200.

FIG. 21 also shows that when the mobile terminal 200 having captured the image of the poster A and having acquired the information of the poster B captures the image of the poster B, the server apparatus 100 performs bonus point addition. The bonus points at this time may be relative to, for example, a distance between a place where the poster A is placed and a place where the poster B is placed. In other words, the longer the distance between the place of the poster A and the place of the poster B is, the more the bonus points which can be provided to the mobile terminal 200 by the server apparatus 100 are.

When the mobile terminal 200 having captured the image of the poster A and having acquired the information of the poster B captures the image of the poster B, the server apparatus 100 may record information on the user of the mobile terminal 200 in a trigger corresponding to the poster B or another service executed in cooperation with an AR system. The server apparatus 100 may then provide the mobile terminal 200 with the information on the user likewise capturing the image of the poster A and then the image of the poster B.

Figure 22:
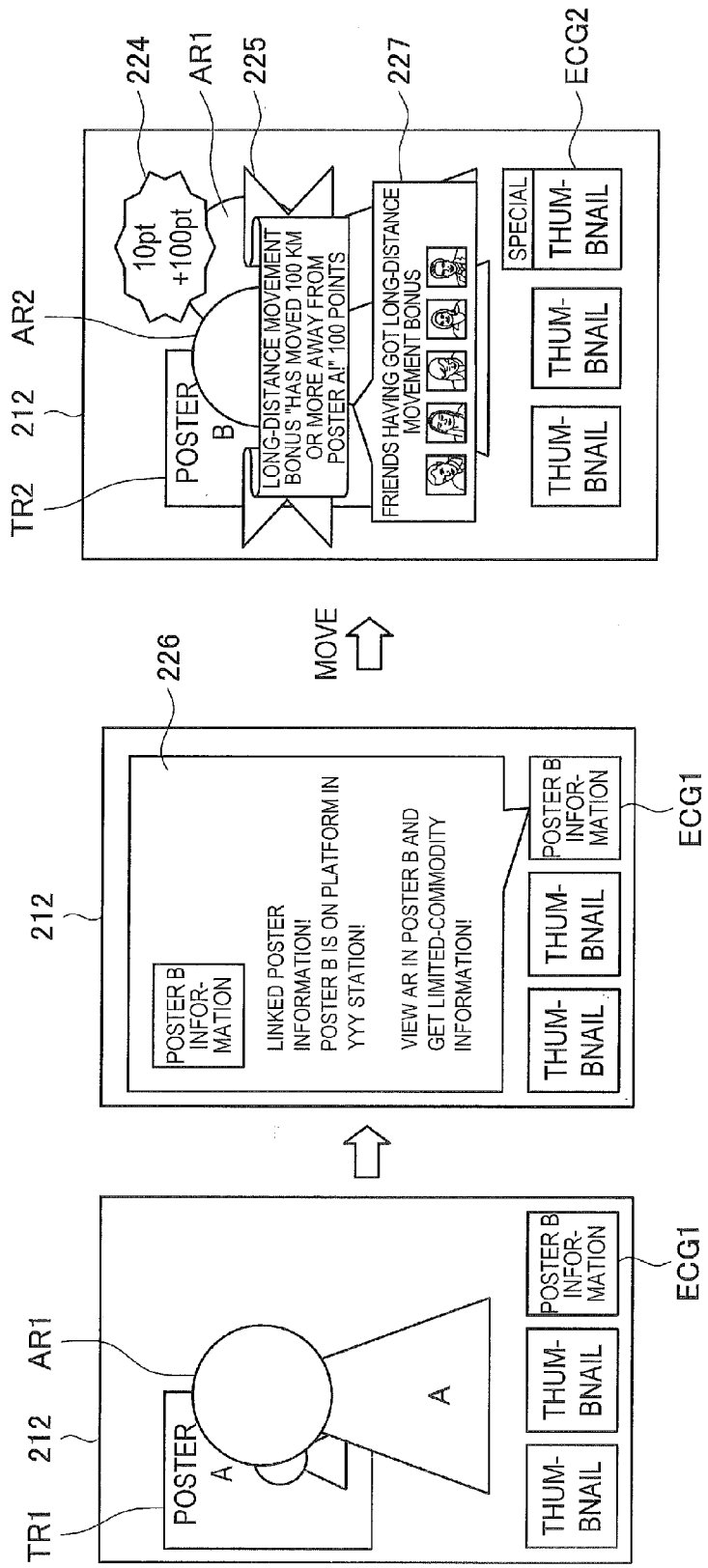
FIG. 22 is an explanatory diagram illustrating an example where the server apparatus 100 provides the mobile terminal 200 with contents.

FIG. 22 is an explanatory diagram illustrating an example where the server apparatus 100 provides the mobile terminal 200 with contents. When the mobile terminal 200 captures an image of the trigger TR1, the server apparatus 100 provides the mobile terminal 200 with an AR content AR1 and an ECG content ECG1 which correspond to the trigger TR1. In the example in FIG. 22, the server apparatus 100 provides information (such as a place and a placement period) of the poster B which is a different trigger from the trigger TR1, as the ECG content ECG1 corresponding to the trigger TR1.

When the user of the mobile terminal 200 selects the information of the poster B displayed in the display unit 212 by operating the operation unit 210, the mobile terminal 200 displays detail information 226 on the poster B in the display unit 212 as illustrated in FIG. 22. By viewing the detail information 226 on the poster B displayed in the display unit 212, the user of the mobile terminal 200 can move to the place of the poster B, carrying the mobile terminal 200 with the user.

The user of the mobile terminal 200 moves to the place of the poster B and captures an image of the poster B by using the mobile terminal 200. Then, the server apparatus 100 provides the mobile terminal 200 with the AR content corresponding to the poster A in addition to an AR content corresponding to the poster B. In addition, when the mobile terminal 200 captures the images of the posters A and B, the server apparatus 100 provides an ECG content including a special content. Moreover, when the mobile terminal 200 captures the images of the posters A and B, the server apparatus 100 provides bonus points.

As illustrated in FIG. 22, the display unit 212 of the mobile terminal 200 displays: the ECG content ECG2 including the special content; the point information 224 indicating the added bonus points; and the bonus point information 225 indicating that the server apparatus 100 provides the bonus points. As illustrated in FIG. 22, the display unit 212 of the mobile terminal 200 also displays user information 227 indicating information on the user likewise capturing the images of the poster A and then the poser B.

Linking the triggers in this manner enables the server apparatus 100 to vary contents provided to the mobile terminal 200 depending on the trigger image capturing by the mobile terminal 200. In particular, as illustrated in FIG. 22, providing a privilege resulting from acquisition of AR contents involved with place movement can lead to high expectation of the advantageous effect that the server apparatus 100 can increase motivation of the user of the mobile terminal 200 to capture an image of a trigger.

Although the cases where different triggers are linked have heretofore been taken as examples, identical triggers may be linked. For example, even if posters are identical, the server apparatus 100 can operate in such a manner as to provide the mobile terminal 200 with different contents, depending on the image capturing place, image capturing time, or how many times an image of the poster is captured.

Figure 23:
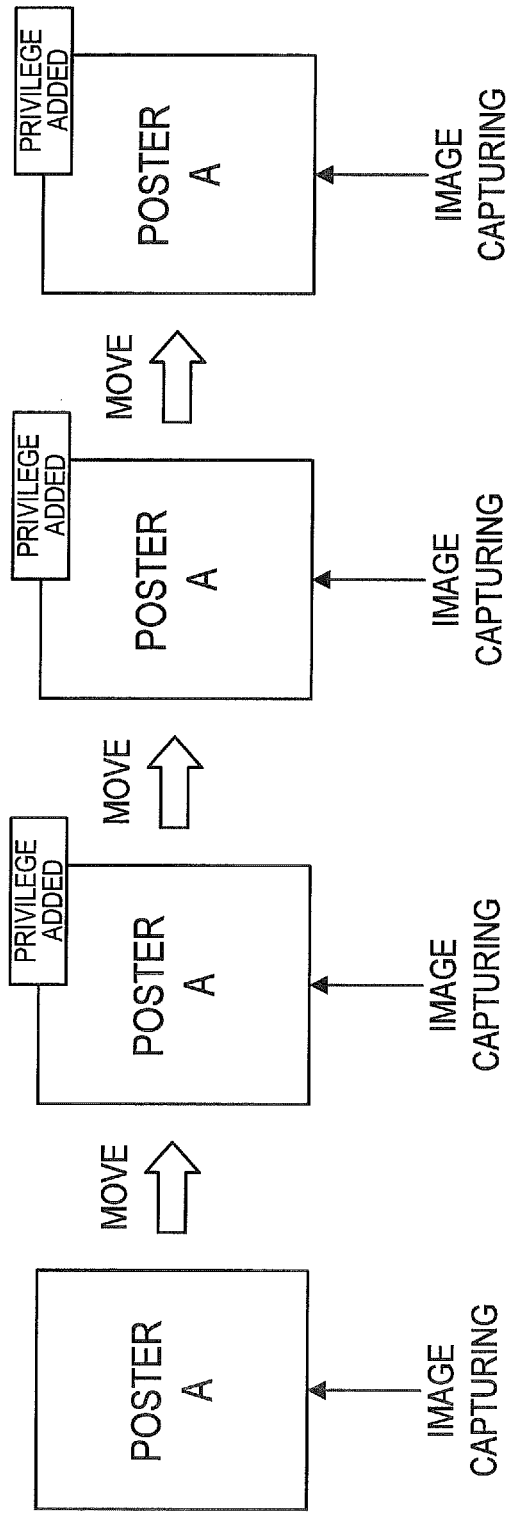
FIG. 23 is an explanatory diagram illustrating a case where identical triggers are linked.

FIG. 23 is an explanatory diagram illustrating a case where identical triggers are linked. FIG. 23 illustrates the poster A as a trigger. Assume that when the mobile terminal 200 captures an image of the poster A, the server apparatus 100 provides the mobile terminal 200 with the character A as an AR content.

FIG. 23 shows that the poster A is placed in different places, and every time the mobile terminal 200 captures an image of the poster A, the server apparatus 100 provides the mobile terminal 200 with additional privileges. Even in the case of the same trigger as described above, providing the mobile terminal 200 with the additional privileges depending on the image capturing place or the number of times of image capturing leads to high expectation of the advantageous effect that the server apparatus 100 can increase motivation of the user of the mobile terminal 200 to capture an image of a trigger.

Figure 24:
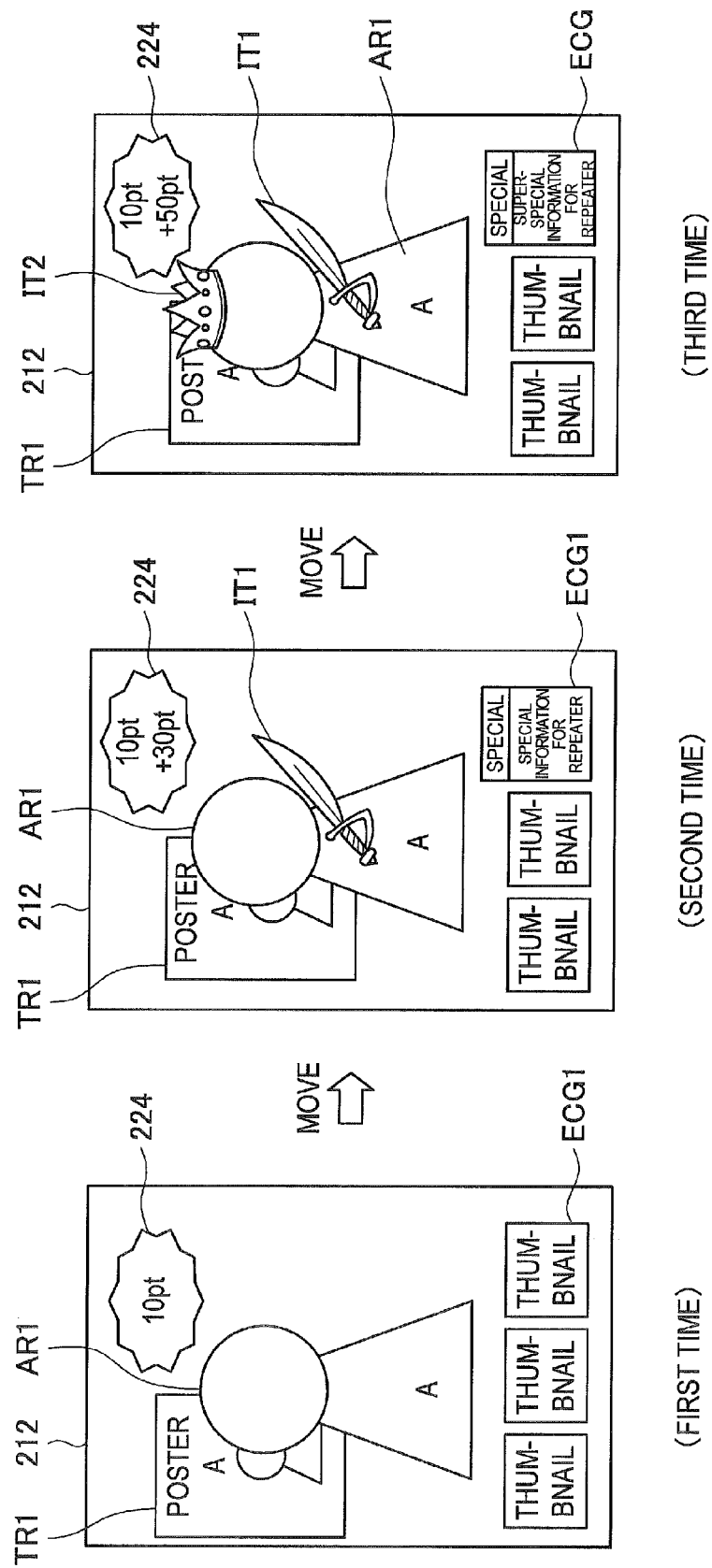
FIG. 24 is an explanatory diagram illustrating an example where the server apparatus 100 provides the mobile terminal 200 with contents.

FIG. 24 is an explanatory diagram illustrating an example where the server apparatus 100 provides the mobile terminal 200 with contents. When the mobile terminal 200 captures an image of the trigger TR1 which is the poster A, the server apparatus 100 provides the mobile terminal 200 with the AR content AR1 and an ECG content ECG1 which correspond to the trigger TR1.

The user of the mobile terminal 200 again finds the poster A in a different place, and thus captures an image of the trigger TR1 which is the poster A by using the mobile terminal 200. The server apparatus 100 knows that the mobile terminal 200 captures the image of the trigger TR1 for the second time, from the log management database 116, and provides the mobile terminal 200 with the contents with privileges added thereto. FIG. 24 illustrates a state where the server apparatus 100 provides the mobile terminal 200 with the AR content AR1 including an item IT1 added thereto as the privilege. In the state illustrated in FIG. 24, the server apparatus 100 also provides the mobile terminal 200 with special information and bonus points as the privileges.

The user of the mobile terminal 200 finds the poster A for the third time in a different place, and thus captures an image of the trigger TR1 which is the poster A by using the mobile terminal 200. The server apparatus 100 knows that the mobile terminal 200 captures the image of the trigger TR1 for the third time, from the log management database 116, and provides the mobile terminal 200 with the contents with privileges added thereto. FIG. 24 illustrates a state where the server apparatus 100 provides the mobile terminal 200 with the AR content AR1 including the item IT1 and an item IT2 added thereto as privileges. In the state illustrated in FIG. 24, the server apparatus 100 also provides the mobile terminal 200 further with special information and the bonus points as the privileges.

Using the same trigger multiple times enables the mobile terminal 200 to acquire the enriched AR content, the bonus points, and the special ECG content. Note that when using the same trigger, the server apparatus 100 may provide a condition for trigger use judgment. For example, the server apparatus 100 may restrict the number of times of the content provision resulting from trigger image capturing to once a day regardless of place. As the number of times of trigger image capturing in the same place, only one time which is the first time may be counted.

Although FIG. 22 illustrates the case where the server apparatus 100 provides information on another poster as information on another trigger, the embodiment of the present disclosure is not limited to the example. For example, as information on another trigger, the server apparatus 100 may provide a different type of trigger from a trigger whose image is captured by the mobile terminal 200. More specifically, for example, when the mobile terminal 200 captures an image of a poster, the server apparatus 100 may provide the mobile terminal 200 with information on a commodity related to the poster as an ECG content which is information on another trigger.

Figure 25:
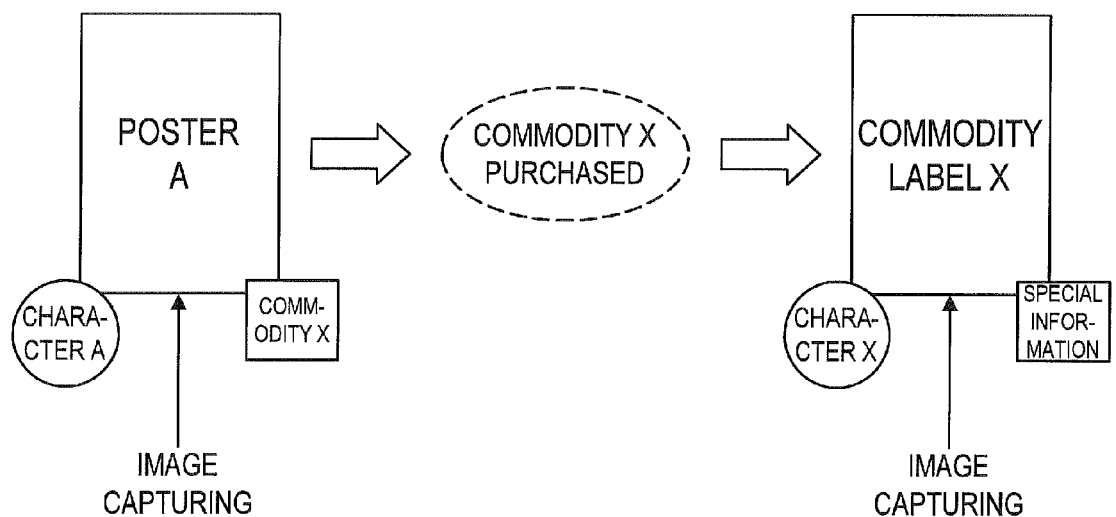
FIG. 25 is an explanatory diagram illustrating an example where different types of triggers are linked.

FIG. 25 is an explanatory diagram illustrating an example where different types of triggers are linked. FIG. 25 illustrates the poster A as a trigger. Assume that when the mobile terminal 200 captures an image of the poster A, the server apparatus 100 provides the mobile terminal 200 with the character A as an AR content. In addition, when the mobile terminal 200 captures the image of the poster A, the server apparatus 100 provides the mobile terminal 200 with information on a commodity X related to the poster A. Together with the information on the commodity X, the server apparatus 100 may provide the mobile terminal 200 with information on a store where the commodity X is available and a coupon for purchasing the commodity X at a lower price.

Various patterns are conceivable as a relationship between the poster A and the commodity X. For example, the poster A may be a poster of an area or a store where the commodity X is sold and may be an advertisement of the commodity X itself. Moreover, the server apparatus 100 may provide the mobile terminal 200 with the information of the commodity X only when the image of the poster A is captured in a particular area.

When the user of the mobile terminal 200 actually purchases the commodity X and captures the image of the commodity X by using the mobile terminal 200, the server apparatus 100 provides the mobile terminal 200 with a character X related to the commodity X as an AR content. The server apparatus 100 may provide the mobile terminal 200 with a special ECG content and bonus points in response to the image capturing of the poster A and the commodity X.

Providing the mobile terminal 200 with information on a commodity related to a poster as an ECG content which is information on another trigger in this manner leads to high expectation of the advantageous effect that the server apparatus 100 can increase motivation of the user of the mobile terminal 200 to purchase a commodity and capture an image of the commodity.

Figure 26:
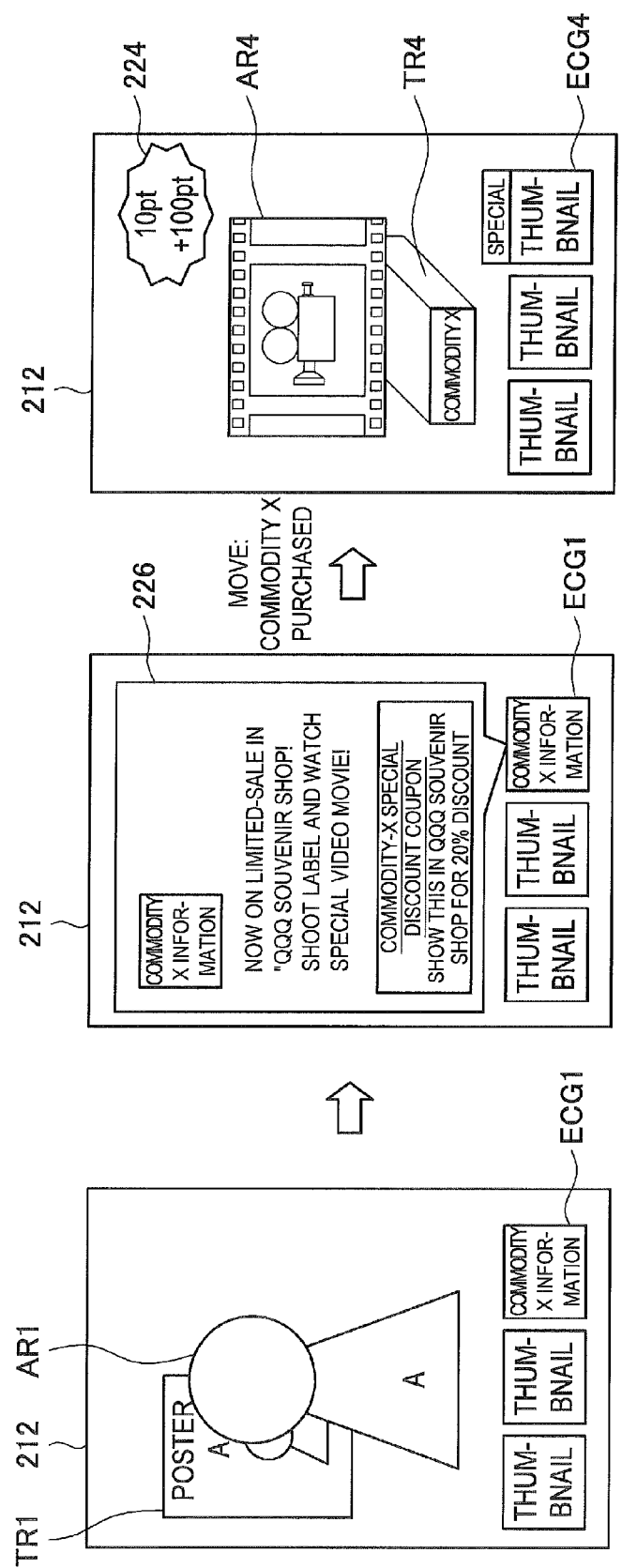
FIG. 26 is an explanatory diagram illustrating an example where the server apparatus 100 provides the mobile terminal 200 with contents.

FIG. 26 is an explanatory diagram illustrating an example where the server apparatus 100 provides the mobile terminal 200 with contents. When the mobile terminal 200 captures an image of the trigger TR1 which is the poster A, the server apparatus 100 provides the mobile terminal 200 with an AR content AR1 and an ECG content ECG1 which correspond to the trigger TR1. The server apparatus 100 also provides the mobile terminal 200 with the information on the commodity X related to the poster A while including the information in the ECG content ECG1.

When the user of the mobile terminal 200 selects the information on the commodity X displayed in the display unit 212 by operating the operation unit 210, the mobile terminal 200 displays detail information 226 on the commodity X in the display unit 212 as illustrated in FIG. 26. By viewing the detail information 226 on the commodity X displayed in the display unit 212, the user of the mobile terminal 200 can move to a place where the commodity X is available, carrying the mobile terminal 200 with the user.

In FIG. 26, the detail information 226 on the commodity X indicates that purchasing the commodity X and capturing an image of a label of the commodity X enables viewing a special video movie and that purchasing the commodity X in a particular store leads to a 20% discount.

When the user of the mobile terminal 200 purchases the commodity X and captures an image of a trigger TR4 which is the label of the commodity X by using the mobile terminal 200, the server apparatus 100 provides the mobile terminal 200 with an AR content AR4 corresponding to the commodity X. The server apparatus 100 also provides the mobile terminal 200 with an ECG content ECG4 including a special content in response to the image capturing of the triggers TR1 and TR4. Moreover, the server apparatus 100 provides the mobile terminal 200 with bonus points in response to the image capturing of the triggers TR1 and TR4. The display unit 212 displays the point information 224 indicating the bonus point addition.

The examples illustrated in FIGS. 25 and 26 show the pattern in which the mobile terminal 200 captures the image of the poster A and then the image of the commodity X. However, also in a case where the mobile terminal 200 captures the image of the commodity X and then the image of the poster A, the server apparatus 100 may likewise provide the mobile terminal 200 with the contents with the privileges added thereto.

As described above, the server apparatus 100 can link a poster with a commodity, but the embodiments of the present disclosure are not limited to the examples. For example, when the mobile terminal 200 captures an image of a poster, the server apparatus 100 may provide the mobile terminal 200 with information on a game card related to the poster as an ECG content which is information on another trigger.

Figure 27:
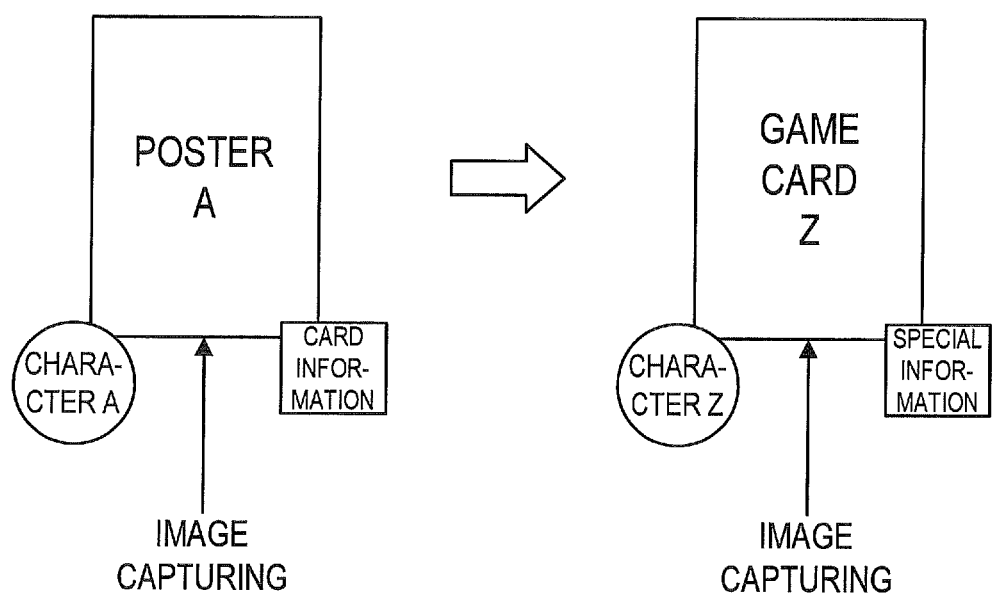
FIG. 27 is an explanatory diagram illustrating an example where different types of triggers are linked.

FIG. 27 is an explanatory diagram illustrating an example where different types of triggers are linked. FIG. 27 illustrates the poster A as a trigger. Assume that when the mobile terminal 200 captures an image of the poster A, the server apparatus 100 provides the mobile terminal 200 with the character A as an AR content. In addition, when the mobile terminal 200 captures the image of the poster A, the server apparatus 100 provides the mobile terminal 200 with information on a game card Z related to the poster A, as an ECG content. When the mobile terminal 200 captures an image of the game card Z, the server apparatus 100 can use the captured image of the game card Z as trigger information.

When the mobile terminal 200 captures the image of the game card Z, capturing the image of the poster A and acquiring information on the game card Z from the server apparatus 100 enables the mobile terminal 200 to make a character of the game card Z stronger in such a manner that the character is equipped with an item or changes appearance. Note that the server apparatus 100 may provide the mobile terminal 200 with the information on the game card Z only in the case where the image of the poster A is captured in a particular area.

FIG. 28 is an explanatory diagram illustrating an example where the server apparatus 100 provides the mobile terminal 200 with contents. When the mobile terminal 200 captures an image of the trigger TR1 which is the poster A, the server apparatus 100 provides the mobile terminal 200 with an AR content AR1 and an ECG content ECG1 which correspond to the trigger TR1. FIG. 28 illustrates a sword which a character of a game card can be equipped with as an AR content AR1. The server apparatus 100 also provides the mobile terminal 200 with the information on the game card Z related to the poster A while including the information in the ECG content ECG1.

When the user of the mobile terminal 200 selects the information on the game card Z displayed in the display unit 212 by operating the operation unit 210, the mobile terminal 200 displays the detail information 226 on the game card Z in the display unit 212, as illustrated in FIG. 28.

FIG. 28 illustrates the detail information 226 on the game card Z indicating that equipping the character of the game card Z with the sword (AR content AR1) makes the character of the game card Z stronger, the sward being acquired from the server apparatus 100 by capturing the image of the poster A.

When the user of the mobile terminal 200 gets the game card Z and captures an image of a trigger TR5 which is the game card Z by using the mobile terminal 200, the server apparatus 100 provides the mobile terminal 200 with an AR content AR5 corresponding to the game card Z. At this time, the server apparatus 100 provides the mobile terminal 200 with the AR content AR5 equipped with the sword (AR content AR1) in response to the image capturing of the triggers TR1 and TR5.

The server apparatus 100 also provides the mobile terminal 200 with an ECG content ECG5 including a special content in response to the image capturing of the triggers TR1 and TR5. FIG. 28 shows that information of a limited weapon is provided as a special content. Moreover, the server apparatus 100 provides the mobile terminal 200 with bonus points in response to the image capturing of the triggers TR1 and TR5. The display unit 212 displays the point information 224 indicating the bonus point addition.

Providing the mobile terminal 200 with information on a game card related to a poster as an ECG content which is information on another trigger in this manner leads to high expectation of the advantageous effect that the server apparatus 100 can increase motivation of the user of the mobile terminal 200 to purchase a game card and capture an image of a game card.

In the case where identical or different triggers are linked as described above, the server apparatus 100 may be configured to exert the advantageous effects resulting from the linking only in the case where an image of the next trigger is captured within a predetermined time period after an image of the first trigger is captured. The predetermined time period may be a relative time period or an absolute time period. In a case where the image of the next trigger is captured after the elapse of the predetermined time period after the image of the first trigger is captured, the server apparatus 100 may provide the same advantageous effect as in the where the images of the triggers are captured independently, without exerting the advantageous effects resulting from the linking.

In addition, in the case where identical or different triggers are linked as described above, the server apparatus 100 may provide the mobile terminal 200 with the corresponding one of the advantageous effects depending on the order of capturing the images of the triggers by using the mobile terminal 200. For example, in a case where a certain user captures images in the order of the poster A, the poster B, and the poster C, and where another user captures images in the order of the poster E, the poster D, and the poster C, the server apparatus 100 can operate in such a manner as to display different AR contents depending on the order of the image capturing.

It goes without saying that the screens illustrated in the drawing referred to in the description so far are merely provided as examples. The screens prepared by the application are not limited to the drawings referred to in the description so far in the embodiments of the present disclosure. It goes without saying that the screens prepared by the application are allowed to be modified without departing from the technical concept of the present disclosure. It should be understood that such modified screens may pertain to the scope of the present disclosure insofar as they are within the scope of the technical concept of the present disclosure.

Acquisition of an AR content and an ECG content is controlled based on the data exchange between the server apparatus 100 and the mobile terminal 200 in the aforementioned embodiments, but the embodiments of the present disclosure are not limited to the examples. For example, the mobile terminal 200 may have the configuration of the server apparatus 100 described above.

In the aforementioned embodiments, when providing the mobile terminal 200 with an AR content and an ECG content, the server apparatus 100 determines the contents to be provided, based on a trigger whose image is captured by the mobile terminal 200. However, the embodiments of the present disclosure are not limited to the examples. For example, the server apparatus 100 may determine an AR content to be provided to the mobile terminal 200 based on a trigger whose image is captured by the mobile terminal 200, and further determine an ECG content to be provided to the mobile terminal 200 based on the content of the determined AR content.

<2. Summarization>

As described above, according to an embodiment of the present disclosure, there is provided the server apparatus 100 which can provide the mobile terminal 200 with a content including AR-content information which is based on a state at the time of capturing an image of a trigger or a state of content acquisition in the past and which corresponds to information on a trigger whose image is captured by the mobile terminal 200.

When acquiring the trigger information from the mobile terminal 200, the server apparatus 100 according to an embodiment of the present disclosure provides the mobile terminal 200 with an AR content corresponding to the trigger information. When providing the AR content, the server apparatus 100 varies the AR content to be provided, depending on whether or not an associated AR content has been provided in the past and what ECG content has been selected by the mobile terminal 200 in the past.

Even if the mobile terminal 200 captures images of the same trigger (marker), controlling the provision of the content in this manner enables the server apparatus 100 according to an embodiment of the present disclosure to provide a different AR content according to a content selection or provision state in the past. Providing a different AR content according to a content selection or provision state in the past can lead to high expectation of an advantageous effect that the user of the mobile terminal 200 is encouraged to use the AR application.

It is not necessary for each step in the processes executed by each apparatus according to embodiments of the present disclosure to be performed in a time series processes, in accordance with the order described in the sequences or flow charts. For example, each step in the processes executed by each apparatus may be performed in parallel, even if the processes are performed in an order difference from the order described as the flow charts.

Further, a computer program for causing hardware, such as a CPU, ROM and RAM built-into each apparatus, to exhibit functions similar to the configurations of each of the above described apparatuses can be created. Further, a storage medium storing this computer program can also be provided. Further, a series of processes can be executed with the hardware, by configuring each of the functional blocks shown by the functional block figures with the hardware.

It should be understood by those skilled in the art that various modifications, combinations, sub-combinations and alterations may occur depending on design requirements and other factors insofar as they are within the scope of the appended claims or the equivalents thereof.

For example, the aforementioned embodiments describe the examples where use of linked triggers is established in such a manner that the same mobile terminal 200 captures images of a plurality of triggers, but the embodiments of the present disclosure are not limited to the examples. For example, even in a case where the same user uses different mobile terminals, the server apparatus 100 can know that the same user uses the different mobile terminals, for example, by prompting the user to input a user ID in using the AR application. When knowing that the same user uses the different mobile terminals, the server apparatus 100 can operate in such a manner that use of linked triggers is established even in the case where images of a plurality of triggers are captured by using the different mobile terminals.

Additionally, the present technology may also be configured as below.

(1) An information processing apparatus including:
a trigger recognition unit configured to acquire a captured image of a trigger and recognize predetermined trigger information included in the captured image; and
a content acquisition unit configured to acquire a content including augmented reality information which is based on a state at a time of capturing the captured image or a state of content acquisition in a past and which corresponds to the predetermined trigger information recognized by the trigger recognition unit.

(2) The information processing apparatus according to (1),
wherein the content acquisition unit acquires the content by using, as the state of content acquisition in the past, a history of the content acquired based on the image capturing of the trigger of the predetermined trigger information.

(3) The information processing apparatus according to (2),
wherein the content acquisition unit varies the acquired content, depending on whether or not a content associated with the content based on the image capturing of the trigger of the predetermined trigger information has been acquired.

(4) The information processing apparatus according to (2) or (3),
wherein the content acquisition unit varies the acquired content, depending on whether or not an image of a trigger having identical trigger information has been captured in the past.

(5) The information processing apparatus according to any one of (2) to (4),
wherein the content acquisition unit varies the acquired content according to the number of times of capturing an image of a trigger having identical trigger information in the past.

(6) The information processing apparatus according to any one of (1) to (5),
wherein the content acquisition unit acquires the content by using, as the state at the time of capturing the captured image, information on an environment of capturing the captured image.

(7) The information processing apparatus according to (6),
wherein the content acquisition unit acquires the content by using, as the information on an environment of capturing the captured image, information on a date and time when the captured image is captured.

(8) The information processing apparatus according to (6) or (7),
wherein the content acquisition unit acquires the content by using, as the information on an environment of capturing the captured image, information on a place where the captured image is captured.

(9) The information processing apparatus according to any one of (1) to (8),
wherein the content acquisition unit acquires the content by using, as the state at the time of capturing the captured image, an attribute of a user who acquires the captured image.

(10) A content providing method including:
acquiring a captured image and recognizing predetermined trigger information included in the captured image; and
acquiring a content including augmented reality information which is based on a state at a time of capturing the captured image or a state of content acquisition in a past and which corresponds to the predetermined trigger information recognized by a trigger recognition unit.

(11) A computer program for causing a computer to execute:
acquiring a captured image and recognizing predetermined trigger information included in the captured image; and acquiring a content including augmented reality information which is based on a state at a time of capturing the captured image or a state of content acquisition in a past and which corresponds to the predetermined trigger information recognized by a trigger recognition unit.

What is claimed is:

1. An information processing apparatus comprising: circuitry including a central processing unit and a memory storing instructions configured to perform the following steps:
   acquire a captured image of a trigger and recognize predetermined trigger information of the trigger included in the captured image;
   acquire a content including augmented reality information which is based on a state at a time of capturing the captured image or a state of content acquisition in a past and which corresponds to the recognized predetermined trigger information; and
   display the acquired content including the augmented reality information superimposed on the captured image of the trigger,
   wherein in case at least one other trigger linked to the trigger is present in the predetermined trigger information, the content including the augmented reality information corresponding to the trigger and the at least one other trigger is acquired and displayed on a display screen, and
   wherein linking between the trigger and the at least one other trigger is registered in a database.

2. The information processing apparatus according to claim 1, wherein the circuitry is configured to acquire the content by using, as the state of content acquisition in the past, a history of the content acquired based on the image capturing of the trigger of the predetermined trigger information.

3. The information processing apparatus according to claim 2, wherein the circuitry is configured to vary the acquired content, depending on whether or not a content associated with the content based on the image capturing of the trigger of the predetermined trigger information has been acquired.

4. The information processing apparatus according to claim 2, wherein the circuitry is configured to vary the acquired content, depending on whether or not an image of a trigger having identical trigger information has been captured in the past.

5. The information processing apparatus according to claim 2, wherein the circuitry is configured to vary the acquired content according to the number of times of capturing an image of a trigger having identical trigger information in the past.

6. The information processing apparatus according to claim 1, wherein the circuitry is configured to acquire the content by using, as the state at the time of capturing the captured image, information on an environment of capturing the captured image.

7. The information processing apparatus according to claim 6, wherein the circuitry is configured to acquire the content by using, as the information on an environment of capturing the captured image, information on a date and time when the captured image is captured.

8. The information processing apparatus according to claim 6, wherein the circuitry is configured to acquire the content by using, as the information on an environment of capturing the captured image, information on a place where the captured image is captured.

9. The information processing apparatus according to claim 1, wherein the circuitry is configured to acquire the content by using, as the state at the time of capturing the captured image, an attribute of a user who acquires the captured image.

10. A content providing method comprising:
    acquiring a captured image of a trigger and recognizing predetermined trigger information of the trigger included in the captured image;
    acquiring a content including augmented reality information which is based on a state at a time of capturing the captured image or a state of content acquisition in a past and which corresponds to the recognized predetermined trigger information; and
    displaying the acquired content including augmented reality information superimposed on the captured image of the trigger,
    wherein in case at least one other trigger linked to the trigger is present in the predetermined trigger information, the content including the augmented reality information corresponding to the trigger and the at least one other trigger is acquired and displayed on a display screen, and
    wherein linking between the trigger and the at least one other trigger is registered in a database.

11. A non-transitory computer-readable storage medium having stored thereon, a set of computer-executable instructions that when executed by a computer causes the computer to perform steps comprising:
    acquiring a captured image of a trigger and recognizing predetermined trigger information of the trigger included in the captured image;
    acquiring a content including augmented reality information which is based on a state at a time of capturing the captured image or a state of content acquisition in a past and which corresponds to the recognized predetermined trigger information; and
    displaying the acquired content including augmented reality information superimposed on the captured image of the trigger,
    wherein in case at least one other trigger linked to the trigger is present in the predetermined trigger information, the content including the augmented reality information corresponding to the trigger and the at least one other trigger is acquired and displayed on a display screen, and wherein
    linking between the trigger and the at least one other trigger is registered in a database.

12. The information processing apparatus according to claim 1,
    wherein the acquired content includes an Electronic Content Guide that comprises a plurality of thumbnail images,
    wherein a thumbnail image of the plurality of thumbnail images is superimposed with another image with additional information based on the time or a place of capturing the captured image.

* * * * *